(12) United States Patent
Uchiki et al.

(10) Patent No.: US 6,601,213 B1
(45) Date of Patent: Jul. 29, 2003

(54) DEMODULATOR AND COMMUNICATIONS SYSTEM

(75) Inventors: Tatsuya Uchiki, Tokyo (JP); Toshiharu Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,525

(22) Filed: Apr. 14, 2000

(30) Foreign Application Priority Data

Jun. 15, 1999 (JP) .......................................... 11-167667

(51) Int. Cl.[7] .............................. H04L 1/02; H04L 7/00
(52) U.S. Cl. ...................... 714/789; 375/340; 375/341; 375/347
(58) Field of Search .................... 714/789; 375/340, 375/341, 347

(56) References Cited

U.S. PATENT DOCUMENTS

| | | | |
|---|---|---|---|
| 5,844,907 A | 12/1998 | Uchiki et al. ................ | 370/517 |
| 5,995,520 A | 11/1999 | Uchiki et al. ................ | 370/516 |
| 6,061,336 A * | 5/2000 | Baker ......................... | 370/320 |
| 6,115,427 A * | 9/2000 | Calderbank et al. ......... | 375/267 |
| 6,259,730 B1 * | 7/2001 | Solondz ...................... | 375/332 |
| 6,278,685 B1 * | 8/2001 | Yonge et al. ................ | 370/203 |

OTHER PUBLICATIONS

The Institute of Electronics, Information and Communication Engineers, B–II, vol. J77–B–II, No. 12, pp 767–779 (1994).

* cited by examiner

*Primary Examiner*—Stephen M. Baker
(74) *Attorney, Agent, or Firm*—Birch, Stewart, Kolasch & Birch, LLP

(57) ABSTRACT

A typical Viterbi decoder having a coherent detection function suffers from degraded performance under certain fading-induced phase shift conditions when used in a time diversity system. This problem is resolved by providing a demodulator for demodulating a data sequence multiplexed by multiplexing a plurality of data sequences of a same content with a time difference inserted therebetween for a time diversity system, which comprises: a phase correction unit 40 for phase correcting the multiplexed data sequence; a diversity combiner for demultiplexing the multiplexed data sequence output from the phase correction unit into a plurality of data sequences, removing the time difference inserted between data sequences, and combining the data sequences; and a Viterbi decoding unit for Viterbi decoding the diversity combined signal from the diversity combiner.

10 Claims, 27 Drawing Sheets

Fig.3

| {A_i} | ... | $A_1$ | $A_2$ | ... | $A_N$ | $A_{N+1}$ | ... |
|---|---|---|---|---|---|---|---|
| {A_i'} | ... | $A_1' = A_{1-N}$ | $A_2' = A_{2-N}$ | ... | $A_N' = A_0$ | $A_{N+1}' = A_1$ | ... |
| {B_i} | ... | $B_1$ | $B_2$ | ... | $B_N$ | $B_{N+1}$ | ... |
| {B_i'} | ... | $B_1' = B_{1-N}$ | $B_2' = B_{2-N}$ | ... | $B_N' = B_0$ | $B_{N+1}' = B_1$ | ... |
| {Γ_i} | ... | $Γ_1$ | $Γ_2$ | ... | $Γ_N$ | $Γ_{N+1}$ | ... |

| $Γ_{1,1} = A_1$ | $Γ_{1,2} = A_1'$ | $Γ_{1,3} = B_1$ | $Γ_{1,4} = B_1'$ | $Γ_{2,1} = A_2$ | $Γ_{2,2} = A_2'$ | $Γ_{2,3} = B_2$ | $Γ_{2,4} = B_2'$ | ... | $Γ_{N,1} = A_N$ | $Γ_{N,2} = A_N'$ | $Γ_{N,3} = B_N$ | $Γ_{N,4} = B_N'$ | $Γ_{N+1,1} = A_{N+1}$ | $Γ_{N+1,2} = A_{N+1}'$ | $Γ_{N+1,3} = B_{N+1}$ | $Γ_{N+1,4} = B_{N+1}'$ |

71,73 : ABSOLUTE VALUE DETECTORS
72,74 : MULTIPLIERS

COHERENT DETECTOR

DEMODULATOR AND COMMUNICATIONS SYSTEM

BACKGROUND OF THE INVENTION

1. Field of the Invention

The present invention relates to a demodulator and to a communications system for use in wireless communications.

2. Description of Related Art

A method of improving the performance of a conventional receiver by incorporating coherent detection in the Viterbi decoder of the receiver is taught, for example, in "Viterbi demodulation with a phase tracking function" (Serizawa, Asakawa, and Murakami, The Institute of Electronics, Information and Communication Engineers B-II, Vol. J77-B-II No. 12, pp. 767–779, December 1994). This related art is described further below with reference to the accompanying figures.

A Viterbi decoder without a coherent detection function is described first as exemplary of the related art. FIG. 18 is a block diagram of a receiver 200 comprising a conventional Viterbi decoder 220. A coherent detector 210 first detects phase synchronization of a signal received by the receiver 200, and then generates a recovered carrier phase synchronized to the received signal. The signal sign is determined based on the phase difference between the recovered carrier and the reception signal.

How the coherent detector 210 detects the signal sign is described next with reference to FIGS. 19A and 19B using by way of example a binary phase shift keying (BPSK) modulation method. In BPSK modulation, the code of a received signal is 0 if the absolute value of the phase difference between the recovered carrier and the received signal is less than or equal to $\pi/2$; if greater than or equal to $\pi/2$, the symbol is 1. That is, if the recovered carrier phase and the carrier phase of the received signal are the same, signals in the shaded area in FIG. 19A are 0, and all other signals are 1.

If we assume that the transmitter sends a 0, a signal will be received at reception signal point "a" under ideal, noise-free conditions. However, received signals are typically not received under such ideal conditions and are detected with some amount of noise. As a result, a signal that should be received with signal phase at point "a" may be received at point A due to this noise as shown in FIG. 19A. If phase synchronization of the recovered carrier and the received signal is perfect, point A will remain in the shaded area even in this case and the signal will be correctly detected as a 0, thus not deteriorating the bit error rate characteristics.

In general, however, phase synchronization between the recovered carrier and the carrier wave of the received signal is not perfect due, for example, to the effects of phase shifting caused by fading in the typical channel of the mobile communications. For example, when the phase of the recovered carrier is different from the carrier wave of the received signal as shown in FIG. 19B due to fading, the above-noted point A will no longer be within the shaded area. The signal at point A will therefore be erroneously detected as a 1, and the bit error rate characteristics of the receiver is deteriorated. That is, if the carrier recovery circuit of the coherent detector does not generate a recovered carrier that is phase synchronized to the received signal, the bit error rate characteristics is likely to be deteriorated.

The operation of the above-noted coherent detector 210 is described next with reference to FIG. 20, a block diagram of the coherent detector 210. As shown in FIG. 20, this coherent detector 210 comprises a multiplier 211 and carrier recovery circuit 212. A received signal input to the coherent detector 210 is applied to the multiplier 211 and to the carrier recovery circuit 212. The carrier recovery circuit 212 generates the recovered carrier as further described below. The multiplier 211 applies coherent detection using the received signal and the recovered carrier output from the carrier recovery circuit 212.

Operation of the carrier recovery circuit 212 is described next below with reference to FIG. 21, a block diagram thereof. As shown in FIG. 21 this carrier recovery circuit 212 comprises a doubler 212a, multiplier 212b, loop filter 212c, voltage-controlled oscillator 212d, PLL circuit 212e, and divide-by-two frequency divider 212f. The received signal input to the carrier recovery circuit 212 is doubled by the doubler 212a. By thus doubling the received signal, the doubler 212a obtains a constant phase regardless of the signal sign. That is, if the signal is 0, the signal phase is 0, and if the signal is 1, the signal phase is $\pi$ with BPSK modulation. By doubling, therefore, signal phase is 0 and $2\pi$, respectively, and matches.

Output from the doubler 212a is input to a PLL circuit 212e comprising multiplier 212b, loop filter 212c, and voltage-controlled oscillator 212d. Output from the PLL circuit 212e is a high SNR signal phase synchronized with the transmission signal carrier wave. The recovered carrier can thus be obtained by divide-by-two frequency division by the frequency divider 212f.

A problem with the above-noted carrier recovery circuit 212 is the phase ambiguity with doubling. This is further described below with reference to the signal space diagrams in FIG. 22A to 22D FIG. 22A shows a received signal distribution. In FIG. 22A the received signal will be distributed within the range of A if the sign of the transmitted signal is 0, and B if the sign is 1, as a result of noise. If the received signal is doubled, the output of doubler 212a can be represented by C in FIG. 22B.

If the doubled signal is then input to PLL circuit 212e to increase the S/N ratio, the distribution range of PLL circuit 212e output will be narrowed as indicated by C' in FIG. 22C due to noise. If the output of PLL circuit 212e is then frequency divided by two by the frequency divider 212f, the recovered carrier may be one of two states A' and B' in FIG. 22D. That is, the recovered carrier has two stable points with indefinite phase offset 180°. It may therefore not be possible to correctly reproduce the carrier wave phase due to doubling by the carrier recovery circuit 212.

In the case of BPSK modulation, the incorrect carrier wave phase will be shifted $\pi$ from the correct carrier wave phase. Shifting the carrier wave phase in this way deteriorates the bit error rate characteristics. Various methods of solving this phase detection problem can be used to avoid this drop in performance, including differential coding, and carrier wave reproduction using a known pattern. Differential coding, however, invites a drop in the SNR, and methods using a fixed pattern invite a drop in transmission efficiency.

The coherent detector 210 in FIG. 18 outputs to the Viterbi decoder 220, the operation of which is described next below with reference to the block diagram thereof shown in FIG. 23. As shown in FIG. 23, the Viterbi decoder 220 comprises a plurality of Viterbi decoding units 221, comparison and selection circuit 222, path metric memory 223, and path memory 224. It is to be noted that transition from state k to state m only in the Viterbi decoder 220 is considered below as operation is the same for other state transitions.

When a received signal is supplied to the Viterbi decoding units 221 at a particular symbol time, a branch metric is obtained by comparing the received signal with an ideal received signal, known as a replica signal, corresponding to a state transition. This replica signal is described next. Assuming a transition from state k to state m, the replica signal will be the signal output from the encoder when the transmission-side convolutional encoder changes from state k to state m. This value is uniformly determined by the convolutional encoder for each state, and is thus known to the receiver.

It is to be noted that the signal output when the transmitter's convolutional encoder changes from state k to state m is identical to this replica signal under ideal conditions free of noise and fading. In other words, the replica signal is the ideal received signal if it is assumed that the received signal was sent when the convolutional encoder changed from state k to state m. It is therefore possible to determine the probability of a branch path from state k to state m based on how closely a received signal matches a replica signal. Because the branch metric is a value determined by comparing the replica and received signal, it can be used as an indicator of the probability of a transition in the received signal from state k to state m.

The branch metric is then added to the path metric stored in the state k path metric memory 221a. The state k path metric is a value indicative of the probability of state k, including past transitions. In other words, by adding the probability, that is, the branch metric, of a transition from state k to m to the state k path metric, it is possible to determine the probability of a path including past transitions from state k to m.

The added metric is then input to he comparison and selection circuit 222 for a comparison and selection operation using the metrics for other state transitions to determine the surviving paths to state m at the next symbol time. More specifically, the probability of a transition path from state k to state m is compared with the path probability of other state transitions to select the most-likely path as the state m path at the next symbol time.

When the most-probable path for a transition from state k to state m, for example, is selected, the metric for this transition from state k to m is stored to the state m path metric memory to update the path information. It is to be noted that the Viterbi decoder 220 has a path memory 224 for each state, that is, memory for storing previous state transitions for each state. When the comparison and selection circuit 222 selects a most-probable state, the selected state is then stored to path memory 224. The stored state transitions are equivalent to the most-probable decoder inputs for each state.

By thus selecting the most-probable path for all states to update the path-metrics and store the state transitions to path memory 224, the most-probable state and the most-probable path back through the trellis from the most-probable state can be selected after all received signal have been received. The path memory content in the most-probable state is the most-probable decoding result, that is, the result with the highest probability. As described above, the Viterbi decoder 220 estimates the most likely path with respect to the convolutional evcoder.

A Viterbi decoder having a coherent detection function is described next below. FIG. 24 is a block diagram of a receiver 201 having a Viterbi decoder 230 with a coherent detection function according to the above-noted paper by Serizawa, et al. This receiver 201 inputs a received signal directly to the Viterbi decoder 230 without performing any detection, and obtains a demodulated result from the Viterbi decoder 230. This Viterbi decoder 230 applies different phase correction to each state of a conventional Viterbi decoder.

Before decoding, phase correction is applied to each state of the received signal input to the Viterbi decoder 230. This phase correction is equivalent to coherent detection. Viterbi decoding is then applied to the phase corrected received signal, the path metric is updated along the most-probable path, and the phase correction level is adjusted. By thus matching phase correction to the Viterbi decoding state, and updating phase correction in conjunction with the path, coherent detection along the most-probable path can be performed simultaneously to decoding. It is thus possible to avoid the phase detection problem that occurs with doubling as noted above, and reliable coherent detection is possible even under extremely low SNR conditions.

Operation of this conventional Viterbi decoder 230 is further described below with reference to FIG. 25. FIG. 25 is a block diagram used to describe transition from state k to state m in a Viterbi decoder 230 having a coherent detection function according to the related art. As shown in FIG. 25, this Viterbi decoder 230 comprises a plurality of Viterbi decoding units 231, a comparison and selection circuit 232, path metric memory 233, and path memory 234. A state k input signal is first phase corrected using a phase correction level specific to that state, that is, phase correction is different for each state. More specifically, if the phase correction factor is $\emptyset^k$, the input signal is multiplied by $\exp(-j\emptyset^k)$.

The Viterbi decoder 230 thus applies phase correction to the received signal using different phase correction for each state. The coherent detector 210 described above compares and detects the phase of the recovered carrier and the received signal. Phase correction in this Viterbi decoder 230, however, achieves coherent detection equivalent to coherent detector 210 using a phase $\emptyset^k$ recovered carrier.

Using this phase-corrected signal and a replica signal, the branch metric corresponding to a transition from state k to state m is then obtained using the same method as a conventional Viterbi decoder 220. The comparision and selection circuit 232 then compares the metrics for transitions from other non-k states to state in using the metrics of the path metrics added to the branch metrics to select the most-probable path. The selected most-probable path is then used to update the path metric.

In conjunction with this metric comparison and selection operation, the phase-corrected received signal is supplied to the phase error calculating circuit 231a. The phase error calculating circuit 231a compares the phase of the-supplied received signal with the replica signal to obtain the phase error. Coherent detection phase error can be obtained by this phase comparison with the replica signal without extracting the modulation component because the replica signal is an ideal received signal.

In other words, the Viterbi decoder 230 having a coherent detection function in this example can detect phase error without frequency doubling. It is therefore possible to avoid performance degradation resulting from such doubling. A phase correction candidate for state m can also be obtained by multiplying this phase error by gain α, and then adding the result to phase correction factor $\emptyset^k$ for state k.

The state m phase correction candidate is supplied with the metric to comparision and selection circuit 232, and phase correction with the larger metric is chosen for phase correction in state m. This operation assures that phase, correction is updated according to the largest metric, that is, the most-probable path. Coherent detection following the most-probable path for Viterbi decoding can thus be achieved by applying different phase correction for each state and changing phase correction as decoding progresses. It is therefore possible to avoid the effects of frequency multiplying in a conventional Viterbi decoder not having a coherent detection function, and an improvement in the bit error rate characteristics can be expected.

As does the above-noted Viterbi decoder 220 not having a coherent detection function, this exemplary Viterbi decoder 230 selects the most-probable state and the most-probable path tracing back from this most-probable state after all symbols in the received signal have been received. The content of the path memory for this most-probable state is output as the decoded result.

An advantage of this Viterbi decoder 230 having a coherent detection function is that better performance can be achieved in comparison with a device in which the Viterbi decoder and coherent detector are separate.

It is to be noted, however, that when this exemplary Viterbi decoder 230 is used in a time diversity communications system, the Viterbi decoder 230 has no function for diversity combining after phase correction. It is therefore necessary to apply time diversity combining before phase correction, that is, before signal-input to the decoder. This means that coherent detection occurs after diversity combining.

A problem with time diversity systems in mobile communications in which phase shifts are introduced by, for example, fading is that because the combined signals are received at different times, it is not possible to generate a combined signal in which the received signal phase is correctly reproduced if diversity combining occurs before detection. This problem is described more specifically below.

It is to be noted that this problem is considered below with reference to a time diversity system in which the transmitter sends the same information-bearing signal offset time T, and the receiver then combines these signals according to the transmission timing T. FIG. 26 is a block diagram of an exemplary system.

Referring to FIG. 26, the transmitter 240 applies the transmission signal directly to a parallel-serial converter 241, and applies the same transmission signal to a delay 242 for delaying the signal an N-bit time T before then applying the signal to the parallel-serial converter 241. The parallel-serial converter 241 then multiplexes the two input signals and outputs data at a rate twice that of the input signals. It will thus be obvious that a time diversity system sends the same data twice with a specific time delay between the two transmissions.

The parallel-serial converter 241 outputs to a BPSK modulator 243 for BPSK modulation. The signal is further amplified using, for example, a radio frequency amplifier (not shown in the figure), and then transmitted from an antenna.

The receiver 250 first amplifies a radio wave received through the antenna using, for example, a radio frequency amplifier (not shown in the figure), and passes the amplified signal to a coherent detector 251. The received signal is then detected by the coherent detector 251, supplied to a serial-parallel converter 252, and demultiplexed to the two data sequences corresponding to those multiplexed by the transmitter.

The signal sequence that was not delayed time T by the transmitter is supplied from the serial-parallel converter 252 to a delay 253. The delay 253 thus delays the signal the same N-bit time T, and the delayed signal is supplied to a combining circuit 254. The transmission signal that was delayed time T by the transmitter is input directly from the serial-parallel converter 252 to the combining circuit 254. The combining circuit 254 combines the two input signals, and the combined signal is then passed to detector 255 to determine whether the signal is a 0 or 1.

FIG. 27 is a signal space diagram of the received signal before it is input to the coherent detector 251 of the above-described time diversity system. Signal A in FIG. 27 is the received signal at time t, and vector a is the carrier phase vector at time t. Signal B is the signal received at time T after signal A was received, that is, the signal received at time t+T, and vector b is the carrier phase vector at time t+T. A small phase difference between a and b means that phase shift as a result of fading during time T is small, and thus indicates that carrier phase shift is small.

Signals A and B are the same-information signals transmitted at a spacing of time T as noted above. Both signals are here assumed to be a 0, that is, signals with the same phase as the carrier wave. If A and B are then combined with equal gain, the result will be C. Because the carrier phase shift is small, the coherent detector 251 can use either a or b for the detection of C, and in both cases will detect a code of 0, that is, the correct result.

However, if a signal B' is received with a carrier phase vector b' as a result of phase shift induced by fading during time T, combining signals A and B' will result in a signal C'. As shown in FIG. 27 the amplitude of this signal C' is lower than that of C. If the signal is detected using vector a, the phase difference between C' and a will be $\pi/2$ or greater, and the signal will thus be falsely detected as a 1.

This means that if diversity combining is performed before detection in a time diversity system, phase shifting caused by fading can prevent diversity combining from being correctly performed, leading to decreased diversity gain and significant degradation in bit error rate performance. On the other hand, diversity combining must be performed before phase correction in a Viterbi decoder having a coherent detection function.

A problem with applying a conventional Viterbi decoder having a coherent detection function in a time diversity system, therefore, is that diversity combining must be performed at a stage before input to the decoder, and there is a deterioration in performance under certain fading induced phase shift conditions.

SUMMARY OF THE INVENTION

Therefore, with consideration for the above mentioned problem, it is an object of the present invention to provide a demodulator and a communication system in which there is no deterioration in performance under certain fading-induced phase shift conditions.

To achieve this object, a demodulator for demodulating a multiplexed data sequence containing a plurality of data sequences of a same content multiplexed with a time difference inserted therebetween, comprises: a phase correcting means for correcting a phase of the multiplexed data sequence; a diversity combining means for separating the multiplexed data sequence output from the phase correcting means into a plurality of data sequences, removing said time difference, and combining said data sequences; and a Viterbi decoding means for Viterbi decoding the diversity combined signal output from the diversity combining means.

The phase correcting means preferably comprises: phase correction memory for storing phase correction factor data; and a multiplier for multiplying the multiplexed data sequence with phase correction factor data read from the phase correction memory.

Yet further preferably, the diversity combining means comprises: a demultiplexing means for separating the multiplexed data sequence into a plurality of data sequences, and outputting the plurality of data sequences; a delay means for delaying at least one of the plurality of data sequences output from the demultiplexing means a delay time equal to the time difference; and a diversity combiner for combining a data sequence delayed by the delay means, and a data sequence input from the demultiplexing means without being delayed by the delay means.

Yet further preferably, the diversity combiner comprises: an absolute value detector for detecting the absolute value of an input data sequence; and a vector adder for weighting the data sequence based on the absolute value detected by the absolute value detector, and then combining the data sequence.

Alternatively, the diversity combiner preferably comprises: a level detector for detecting the received signal level of an input data sequence; and a data sequence selector for selecting a data sequence delayed by the delay means, or a data sequence output from the demultiplexing means and not delayed by the delay means, based on the received signal level detected by the level detector.

The present invention further provides a communication system comprising a transmitter for modulating and transmitting a supplied signal, and a receiver for receiving a signal transmitted by the transmitter and demodulating the received signal. The transmitter of this communication system comprises: a convolutional encoding means for convolutional encoding a supplied signal and outputting convolutional coded data sequences; a multiplexing means for branching a data sequence output from the convolutional encoding means into a plurality of data sequences, and multiplexing the data sequences with a time difference inserted therebetween; and a modulation means for modulating a multiplexed data sequence generated by the multiplexing means to generate a transmission signal. The receiver in this communication system comprises: a phase correcting means for correcting a phase of a received signal; a diversity combining means for separating a signal output from the phase correcting means into a plurality of data sequences, removing the inserted time difference, and combining the data sequences; and a Viterbi decoding means for Viterbi decoding the combined signal output from the diversity combining means.

In a further communication system comprising a transmitter for modulating and transmitting a supplied signal, and a receiver for receiving a signal transmitted by the transmitter and demodulating the received signal according to the present invention, the transmitter comprises: a second convolutional encoding means for convolutional encoding a supplied signal at a ¼ coding rate and outputting four data sequences; a second multiplexing means for branching each data sequence output from the second convolutional encoding means into two data sequences, and multiplexing the data sequences with a time difference inserted therebetween; and a modulation means for modulating a multiplexed data sequence generated by the second multiplexing means to generate a transmission signal. The receiver in this communication system comprises: a phase correcting means for correcting a phase of a received signal; a second diversity combining means for separating a signal output from the phase correcting means into eight data sequences, removing the inserted time difference from the data sequences, and combining the data sequences; and a Viterbi decoding means for Viterbi decoding the combined signal output from the second diversity combining means.

In a further communication system comprising a transmitter for modulating and transmitting a supplied signal, and a receiver for receiving a signal transmitted by the transmitter and demodulating the received signal according to the present invention, the transmitter comprises: a convolutional encoding means for convolutional encoding a supplied signal and outputting two data sequences; a third multiplexing means for branching each data sequence output from the convolutional encoding means into two data sequences to obtain four parallel data sequences, respectively delaying the second, third, and fourth of these four data sequences a delay time T, 2T, and 3T (where T is a specific time), and then multiplexing the data sequences; and a modulation means for modulating a multiplexed data sequence generated by the third multiplexing means to generate a transmission signal. The receiver in this communication system comprises: a phase correcting means for correcting a phase of a received signal; a third diversity combining means for separating a signal output from the phase correcting means into four data sequences, removing the inserted time difference from the data sequences, and combining the data sequences; and a Viterbi decoding means for Viterbi decoding the combined signal output from the third diversity combining means.

In a further communication system comprising a transmitter for modulating and transmitting a supplied signal, and a receiver for receiving a signal transmitted by the transmitter and demodulating the received signal according to the present invention, the transmitter comprises: a convolutional encoding means for convolutional encoding a supplied signal and outputting two data sequences; a fourth multiplexing means for branching each data sequence output from the convolutional encoding means into two data sequences to obtain four parallel data sequences, respectively delaying the second, third, and fourth of these four data sequences a delay time 2T, T, and 3T (where T is a specific time), changing the order of these data sequences, and then multiplexing the data sequences; and a modulation means for modulating a multiplexed data sequence generated by the fourth multiplexing means to generate a transmission signal. The receiver in this communication system comprises: a phase correcting means for correcting a phase of a received signal; a fourth diversity combining means for separating a signal output from the phase correcting means into four data sequences, removing the inserted time difference from the data sequences, restoring the order of the data sequences, and combining the data sequences; and a Viterbi decoding means for Viterbi decoding the combined signal output from the fourth diversity combining means.

In a further communication system comprising a transmitter for modulating and transmitting a supplied signal, and a receiver for receiving a signal transmitted by the transmitter and demodulating the received signal according to the present invention, the transmitter comprises: a convolutional encoding means for encoding a supplied signal and outputting a plurality of data sequences; a multiplexing means for branching each data sequence output from the convolutional encoding means, and multiplexing the data sequences with a time difference inserted therebetween; a modulation means for modulating a multiplexed data sequence generated by the multiplexing means; and a spectrum spreading means for spectrum spreading the modulation signal output by the modulation means to obtain a transmission signal. The receiver in this communication system comprises: a spectrum despreading means for despreading a received signal spectrum; a phase correcting means for correcting a phase of a signal output from the spectrum despreading means; a diversity combining means for separating a signal output from the phase correcting means into a plurality of data sequences, removing the inserted time difference, and combining the data sequences; and a Viterbi decoding means for Viterbi decoding the combined signal output from the diversity combining means.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 shows the time change in the data sequence delayed time T, and the output of the parallel-serial converter;

FIG. 4 shows the time change in the received signal sequence not delayed by the transmitter, and the received signal sequence delayed time T by the transmitter;

DESCRIPTION OF THE PREFERRED EMBODIMENTS

The preferred embodiments of a demodulator and a communication system according to the present invention are described below with reference to the accompanying figures.

Embodiment 1

Figure 1:
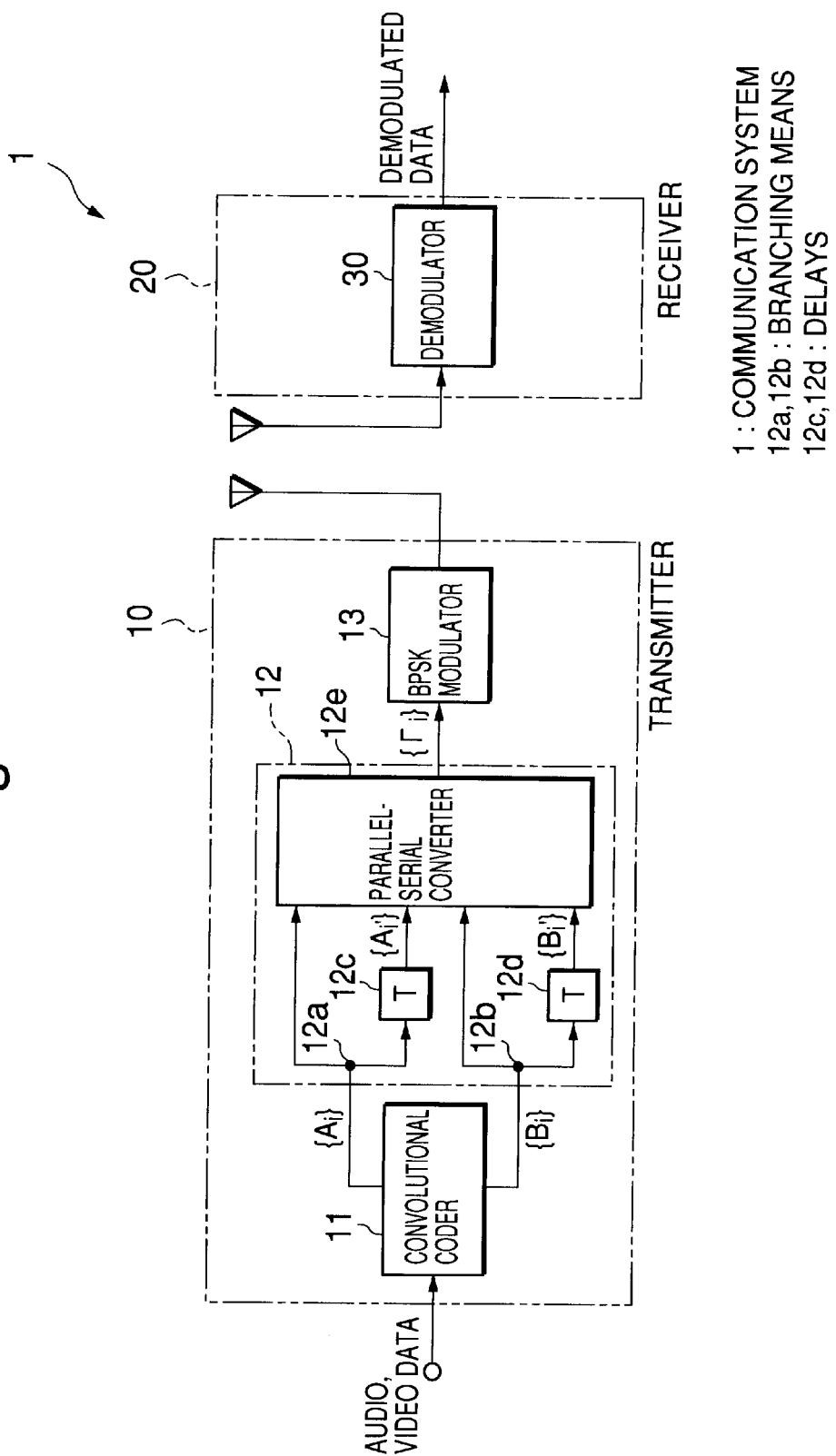
FIG. 1 is a block diagram of a communication system according to a first preferred embodiment of the present invention.

FIG. 1 is a block diagram of a communication system 1 according to a first preferred embodiment of the present invention. As shown in FIG. 1 this communication system 1 comprises a transmitter 10 for modulating and transmitting an input signal, and a receiver 20 for receiving a signal transmitted by the transmitter 10 and demodulating the received signal.

The transmitter 10 comprises a convolutional encoder (convolutional encoding means) 11, a multiplexer 12, and BPSK modulator (modulation means) 13. The convolutional encoder 11 performs convolutional coding of audio and image data supplied thereto, and outputs two data sequences. The multiplexer 12 generates two data sequences with a time difference therebetween from each of the data sequences supplied from the convolutional encoder 11, and multiplexes the resulting data sequences. The BPSK modulator 13 then modulates the multiplexed data sequences output from the multiplexer 12 using a binary phase shift keying (BPSK) method to generate the transmission signal.

The multiplexer 12 comprises branching means 12a and 12b for branching each of the two data sequences output from the convolutional encoder 11 into two sequences, delays 12c and 12d, and parallel-serial converter 12e. The delays 12c and 12d each delay one of the two data sequences branched from the branching means 12a and 12b for a delay time equal to an N bit data period T. The parallel-serial converter 12e multiplexes the data sequences delayed by the delays 12c and 12d, and the data sequences supplied directly from the branching means 12a and 12b and not delayed by the delays 12c and 12d.

The receiver 20 comprises a demodulator 30 for demodulating a multiplexed data sequence output from the transmitter 10. As shown in the block diagram in FIG. 2, this demodulator 30 comprises: a plurality of state processors 31 equal in number to the number of Viterbi decoding states; a comparison circuit 32 for comparing the metrics output from the plurality of state demodulation processors 31; a selection circuit 33 for selecting a specific metric from the plurality of metrics output from the state demodulation processors 31 based on the result supplied from the comparison circuit 32; path memory 34 for storing for each state the past state transitions output from the comparison circuit 32; path metric memory 35 for storing the metric selected by the selection circuit 33 for each state; and phase correction memory 36 for storing phase correction factor data.

The state demodulation processors 31 each comprise: a phase correction unit 40 for phase correcting the received signal (multiplexed data sequence); a diversity combiner 50; and a Viterbi decoding unit 60. The diversity combiner. 50 separates the multiplexed data sequence output from the phase correction unit 40 into a plurality of data sequences, and removes the time difference therebetween and then combines the data sequences. The Viterbi decoding unit 60 then Viterbi decodes the combined signal output from the diversity combiner 50. The phase correction unit 40 further comprises phase correction memory 41 for storing phase correction factor data, and a multiplier (multiplying unit) 42 for multiplying the received signal by the phase correction factor data output from the phase correction memory 41.

The diversity combiner 50 comprises a serial-parallel converter (separator) 51, shift registers (delays) 52 and 53, combining circuit (combiner) 54, and combining circuit (combiner) 55. The serial-parallel converter 51 serial-parallel converts the multiplexed data sequence output from the multiplier 42 to separate and parallel output the four data sequences of these four parallel data sequences output from the serial-parallel converter 51, the first and third data sequences are passed to the shift registers 52 and 53, and are thereby delayed time T. One combining circuit 54 combines the second data sequence output from the serial-parallel converter 51 with the data sequence output from shift register 52. The other combining circuit 55 combines the fourth data sequence output from the serial-parallel converter 51 with the data sequence output from shift register 53.

The Viterbi decoding unit 60 comprises branch metric calculator 61, path metric memory 62, and adder 63. The branch metric calculator 61 calculates the branch metric of the combined data sequences supplied thereto from the combining circuits 54 and 55. The path metric memory 62 stores the path metric for each state. The adder 63 adds the path metric stored to path metric memory 62 to the branch metric output from the branch metric calculator 61, and parallel outputs the result to the comparison circuit 32 and selection circuit 33.

It should be here noted that the state demodulation processors 31 further comprise a phase error calculator 64 for calculating phase error in the received signal; a multiplier 65 for multiplying the phase error obtained by the phase error calculator 64 by a coefficient α; and an adder 66 for adding the result output from the multiplier 65 to the phase correction factor data output from phase correction memory 41, and supplying the result to selection circuit 33.

Operation of a communication system 1 thus comprised is described next below. It is to be noted that the audio, video, and other data shown in FIG. 1 is a data sequence to be converted by, for example, an audio codec (not shown in the figure) to a digital signal for transmission. The data sequence is input to the transmitter 10 and convolutionally coded by a convolutional encoder 11 at a coding rate of R=½. Each of the two data sequences output from the convolutional encoder 11 is branched into two branch sequences, of which one each is input directly to the parallel-serial converter 12e and the other is supplied to a delay 12c or 12d. Each of the delays 12c and 12d delays the signal a time equal to an N bit data period T, and then outputs the time T delayed signal to the parallel-serial converter 12e. The parallel-serial converter 12e then converts the four parallel input data sequences to a serial data sequence with a data rate four times that of the input data sequence.

Data conversion by this parallel-serial converter 12e is further described below with reference to FIG. 3. FIG. 3 shows convolutional coded data sequences {Ai} and {Bi}; data sequences {Ai'} and {Bi'}, which are data sequences {Ai} and {Bi} delayed N bits by delays 12c and 12d equivalent to delay time T; and the time change in output {Γi} from parallel-serial converter 12e. It is to be noted that i is an integer indicative of a data index. The relationship between {Ai} and {Ai'}, and {Bi} and {Bi'}, can be expressed as follows.

$$A_i' = A_{i-N}$$

$$B_i' = B_{i-N}$$

Output {Γi} from parallel-serial converter 12e can be expressed using {Ai}, {Ai'}, {Bi} and {Bi'} as follows.

$$\Gamma_i = \{\Gamma_{i,1}, \Gamma_{i,2}, \Gamma_{i,3}, \Gamma_{i,4}\} = \{A_i, A_i', B_i, B_i'\} = \{A_i, A_{i-N}, B_i, B_{i-N}\}$$

Output from the parallel-serial converter 12e is then BPSK modulated by the BPSK modulator 13, power amplified by a radio frequency amplifier (not shown in the figure), and then transmitted. The transmitted radio wave is then received by the receiver 20, power amplified by a radio frequency amplifier (not shown in the figure), and then input to the demodulator 30.

Figure 2:
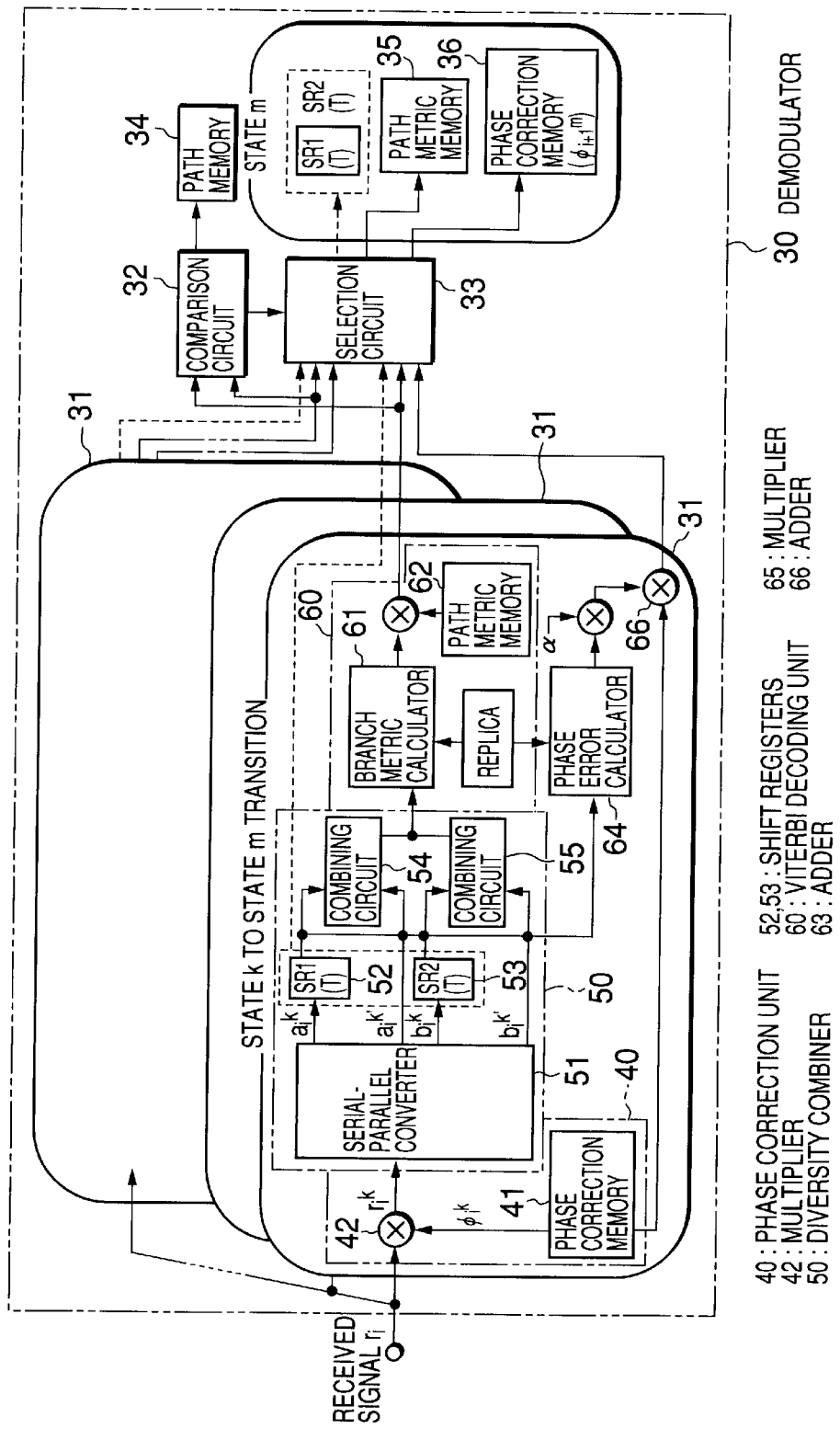
FIG. 2 is a block diagram of the demodulator shown in FIG. 1.

Operation of the demodulator 30 is described next. It will be obvious to one with ordinary knowledge of the related art that, while transition from state k to state m only during Viterbi decoding is described below, operation in other state transitions is the same. As shown in FIG. 2, received signal $r_i$ input to the demodulator 30 is applied to multiplier 42 for phase correction using the phase correction factor $\varnothing_i^k$, which is different for each state and is stored in phase correction memory 41. Therefore, if the multiplier output is $r_i^k$, then $$r_i^k = r_i \times \exp(-j\varnothing_i^k).$$

It is to be noted that this phase correction is the same as the phase correction operation of a conventional Viterbi decoder having a phase correction function as described in the related art above, and is equivalent to coherent detection of each state.

The phase corrected received signal $r_i^k$ output from the multiplier 42 is input to serial-parallel converter 51. The serial-parallel converter 51 converts the received signal $r_i^k$ to four parallel received signal sequences with a data rate ¼ that of the received signal $r_i^k$, and outputs these four parallel data sequences.

Figure 4:
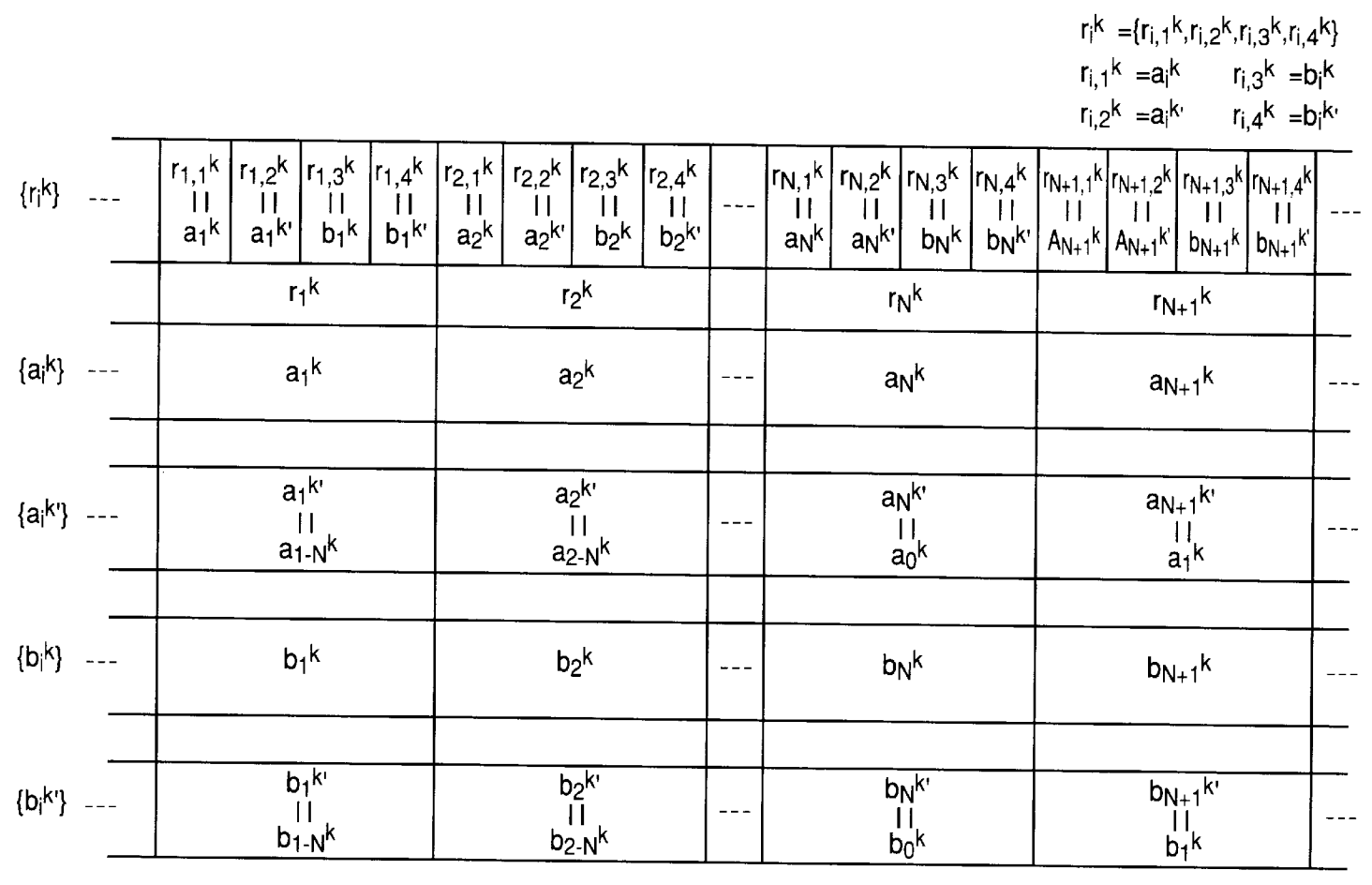

The conversion operation of this serial-parallel converter 51 is further described below with reference to FIG. 4. FIG. 4 shows the time change in the received signal sequence $\{r_i^k\}$ input to serial-parallel converter 51, the received signal sequences $\{a_i^k\}$ and $\{b_i^k\}$ of the serial-parallel converter 51 output that were not delayed by the transmitter 10, and the received signal sequences $\{a_i'^k\}$ and $\{b_i'^k\}$ of the serial-parallel converter 51 output that were delayed delay time T equivalent to an N bit data period by delays 12c and 12d.

As shown in FIG. 4, the relationship between $\{r_i^k\}$ and $\{a_i^k\}$, $\{a_i'^k\}$, $\{b_i^k\}$ and $\{b_i'^k\}$ can be expressed as follows.

$$\{r_i^k\} = \{r_{i,1}^k, r_{i,2}^k, r_{i,3}^k, r_{i,4}^k\} = \{a_i^k, a_i'^k, b_i^k, b_i'^k\}$$

If errors introduced by noise are ignored, the relationship between $\{a_i^k\}$ and $\{a_i^{k'}\}$, and $\{b_i^k\}$ and $\{b_i^{k'}\}$ can be expressed as follows using bits N per time T because $\{a_i^{k'}\}$ and $\{b_i^{k'}\}$ are delayed time T equal to an N bit data period from $\{a_i^k\}$ and $\{b_i^k\}$.

$$a_i^{k'} = a_{i-N}^k$$

$$b_i^{k'} = b_{i-N}^k$$

It is therefore possible to express $\{r_i^k\}$ as follows using $\{a_i\}$ and $\{b_i^k\}$.

$$\{r_i^k\} = \{a_i^k, a_i^{k'}, b_i^k b_i^{k'}\} = \{a_i^k, a_{i-N}^k, b_i^k, b_{i-N}^k\}$$

Of the four demultiplexed received signal sequences $\{a_i^k\}$ $\{a_i^{k'}\}$, $\{b_i^k\}$ and $\{b_i^{k'}\}$ output from serial-parallel converter 51, the sequences $\{a_i^{k'}\}$ and $\{b_i^{k'}\}$ delayed N bit equivalent delay time T on the transmission side are input directly to the combining circuits 54 and 55 and phase error calculator 64. The sequences $\{a_i^k\}$ and $\{b_i^k\}$ that were not delayed N bit equivalent delay time T on the transmission side are input to shift registers 52 and 53.

The shift registers 52 and 53 then delay the sequences $\{a_i^k\}$ and $\{b_i^k\}$ input thereto by a delay time T equivalent to the same N bit data period. The pair of shift registers 52 and 53 thus output signals received N bits earlier. That is, the one shift register 52 outputs $\{a_{i-N}^k\}$ and the other shift register 53 outputs $\{b_{i-N}^k\}$.

As a result, both of the received signal sequences input to combining circuit 54 have been delayed time T on either the sending or receiving side, and are $\{a_{i-N}^k\}$. Both of the received signal sequences input to combining circuit 55 have likewise been delayed time T on either the sending or receiving side, and are $\{b_{i-N}^k\}$. The received signals are then combined with equal gain by both combining circuits 54 and 55, and output to branch metric calculator 61.

Figure 5:
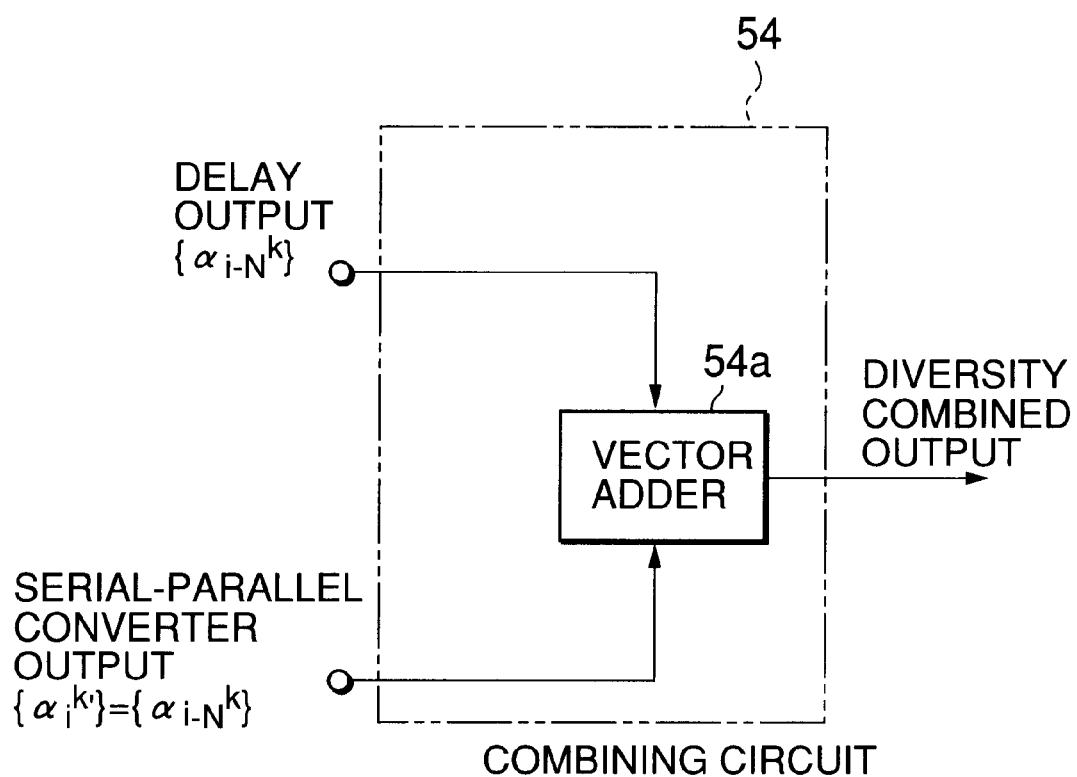
FIG. 5 is a block diagram of a combining circuit performing equal gain diversity combining.

Operation of combining circuits 54 and 55 is further described below with reference to FIG. 5. FIG. 5 is a block diagram of an exemplary combining circuit 54 for performing equal gain diversity combining. It is to be noted that combining circuit 55 is identical to combining circuit 54.

As shown in FIG. 5, combining circuit 54 comprises a vector adder 54a for performing equal gain combining. The data sequences $\{a_i^{k'}\}$ and $\{a_{i-N}^k\}$ input to the combining circuit 54 are applied to vector adder 54a, added with equal gain, and then output from the combining circuit 54. If the output from combining circuit 54 is $\alpha_i^k$ and the output of combining circuit 55 is $\beta_i^k$, then $$\alpha_i^k = a_{i-N}^k + a_i^{k'}$$

$$\beta_i^k = b_{i-N}^k + b_i^{k'}.$$

The received signals combined and output from combining circuits 54 and 55 are input to the branch metric calculator 61 whereby branch metric $Bm_{i,i+1}^{k \to m}$ is obtained. If the replica signal of $a_i^k$ is $ra_i^k$, and the replica signal of $b_i^k$ is $rb_i^k$, then branch metric $Bm_{i,i+1}^{k \to m}$ can be obtained from the following equation.

$$Bm_{i,i+1}^{k \to m} = |\alpha_i^k - ra_i^k|^2 + |\beta_i^k - rb_i^k|^2$$

The branch metric calculator 61 outputs the resulting branch metric $Bm_{i,i+1}^{k \to m}$ to adder 63, which adds branch metric $Bm_{i,i+1}^{k \to m}$ and the state k path metric $Pm_i^k$ supplied from path metric memory 62. The adder 63 then parallel outputs metric $M_{i,i+1}^{k \to m}$ corresponding to a transition from state k to state m to the comparison circuit 32 and selection circuit 33. This metric $M_{i,i+1}^{k \to m}$ can thus be expressed as:

$$M_{i,i+1}^{k \to m} = Pm_i^k + Bm_{i,i+1}^{k \to m}.$$

The comparison circuit 32 compares the state k to state m metric $M_{i,i+1}^{k \to m}$ with metrics corresponding to other state transitions to detect the path with the largest metric, that is, the most probable path. The comparison circuit 32 then outputs a signal indicative of this most-probable path to the selection circuit 33. In this exemplary embodiment the comparison circuit 32 outputs 0 to the selection circuit 33 if the metric $M_{i,i+1}^{k \to m}$ for a state k to state m transition is larger than the metric corresponding to another state transition. If the opposite is true, the comparison circuit 32 outputs 1. It is assumed below that the comparison circuit 32 outputs 0 to the selection circuit 33, that is, the metric $M_{i,i+1}^{k \to m}$ for a state k to state m transition is larger.

The outputs $\{a_{i-N}^k\}$ and $\{b_{i-N}^k\}$ from shift registers 52 and 53, and the outputs $\{a_i^{k'}\}$ and $\{b_i^{k'}\}$ from serial-parallel converter 51 not input to the shift registers 52 and 53, are input to the combining circuits 54 and 55 and to phase error calculator 64. The phase error calculator 64 compares the phase of $\{a_{i-N}^k\}$ and $\{a_i^{k'}\}$, $\{b_{i-N}^k\}$ and $\{b_i^{k'}\}$, and the replica signals to obtain the phase error. The replica signal is the ideal received signal for a state k to state m transition. It is therefore possible by comparing the phase of $a_{i-N}^k$ and $\{a_i^{k'}\}$, $\{b_{i-N}^k\}$ and $\{b_i^{k'}\}$ with a corresponding replica signal to obtain the same phase error similarly to detecting by a coherent detector.

Figure 6:
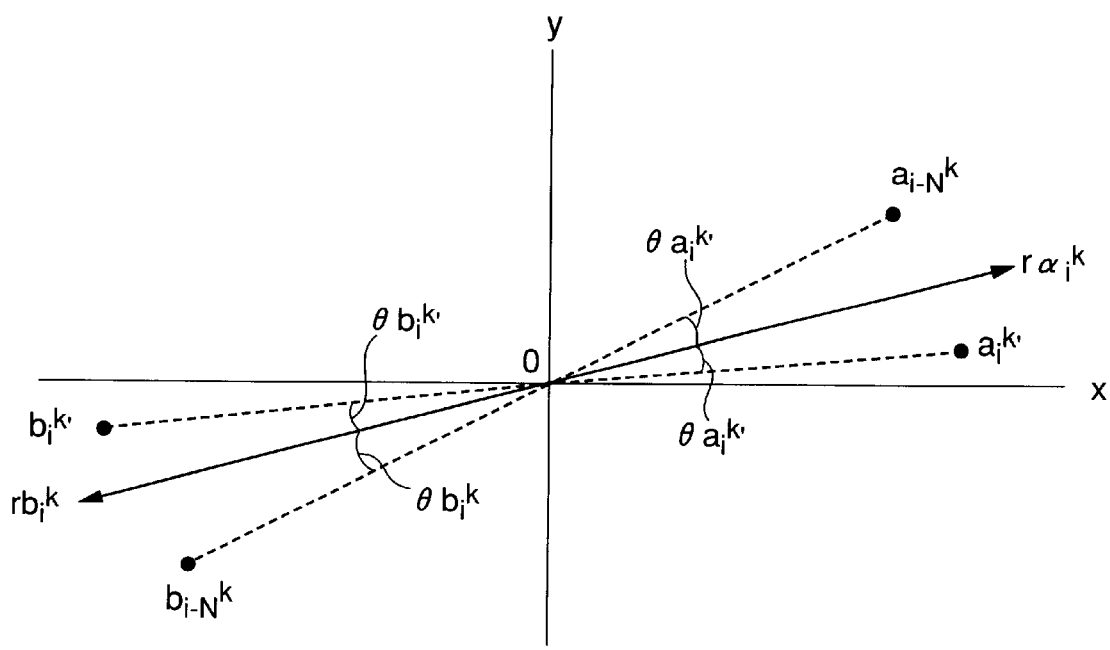
FIG. 6 is a signal space diagram showing phase error in the phase error calculator.

A specific method for obtaining phase error by means of phase error calculator 64 is described next with reference to FIG. 6. FIG. 6 is a signal space diagram in which $ra_i^k$ and $rb_i^k$ are replica signals for a state k to state m transition. It is to be noted that the carrier vector has the same direction as $ra_i^k$, that is, $ra_i^k$ is 0 and $rb_i^k$ is 1. Because replica $ra_i^k$ is an ideal received signal for received signals $a_i^k$ and $a_i^{k'}$, phase error $\theta_i^k$ can be expressed as $$\theta_i^k = \theta a_i^k + \theta a_i^{k'} + \theta b_i^k + \theta b_i^{k'}$$

using phase error $\theta a_i^k$ between $a_{i-N}^k$ and $ra_i^k$, phase error $\theta a_i^{k'}$ between $a_i^{k'}$ and $ra_i^k$, phase error $\theta b_i^k$ between $b_{i-N}^k$ and $rb_i^k$, and phase error $\theta b_i^{k'}$ between $b_i^k$ and $rb_i^k$.

Phase error $\theta_i^k$ obtained by phase error calculator 64 is then input to multiplier 65 and multiplied by coefficient $\alpha$. The result is input to adder 66 and added thereby to phase correction factor $\emptyset_i^k$ output from the phase correction memory 41.

The adder 66 outputs phase correction factor candidate $\emptyset_{i,i+1}^{k \to m}$ for a state k to state m transition. This candidate $\emptyset_{i,i+1}^{k \to m}$ is expressed as:

$$\emptyset_{i,i+1}^{k \to m} = \emptyset_i^k + \alpha \theta_i^k.$$

In this first embodiment according to the present invention it is assumed as a result of the path metric comparison by comparison circuit 32 that the path metric from state k to state m is larger than the path metric along other paths, that is, that the state transition from state k to state m is more likely than other state transitions. The phase correction factor $\emptyset_{i+1}^m$ for the next state m is therefore updated to $\emptyset_{i,i+1}^{k \to m}$, that is, $\emptyset_{i,i+1}^{k \to m}$ is stored as phase correction factor $\emptyset_{i+1}^m$.

Based on input from comparison circuit 32, selection circuit 33 selects the path metric of the input, phase correction factor, and shift register, and updates the values for state m at the next time. If the comparison circuit 32 outputs 0 as described above, selection circuit 33 selects metric $M_{i,i+}$ $1^{k \to m}$ corresponding to a state k to state m transition, and inputs this metric to the state m path metric memory. It also selects phase correction factor $\emptyset_{i,i+1}^{k \to m}$ for this state k to state m transition, and inputs this factor to the state m phase correction memory. It also inputs the state k shift register value to the state m shift register.

A demodulator 30 according to this preferred embodiment of the present invention performs the above described updating operation for every state. After all signals have been received, the demodulator 30 selects the most-probable state and the most-probable path back from this most-probable state. The content of the path memory for this most-probable state, is output as the decoded result. The signal output from the demodulator 30 is then decoded by, for example, an audio codec (not shown in the figures), and the audio, video, or other data is output.

A demodulator according to this first preferred embodiment of the present invention thus comprises a serial-parallel converter 51 and shift registers 52 and 53 required in a time diversity system for each state of a Viterbi decoder. It is therefore possible to perform diversity combining according to the received signal timing after phase correction for each state.

Furthermore, in addition to updating the phase correction factor according to the most-probable path similarly to a Viterbi decoder having a coherence detection function according to the related art, a demodulator according to this preferred embodiment of the invention also updates shift register content to simultaneously achieve coherent detection and time diversity along the surviving of the Viterbi decoder. While impossible to achieve according to the related art, it is therefore possible to apply a demodulator according to the present invention to a time diversity system with coherent detection applied to each Viterbi decoding state, thereby achieving good characteristics.

Embodiment 2

Figure 7:
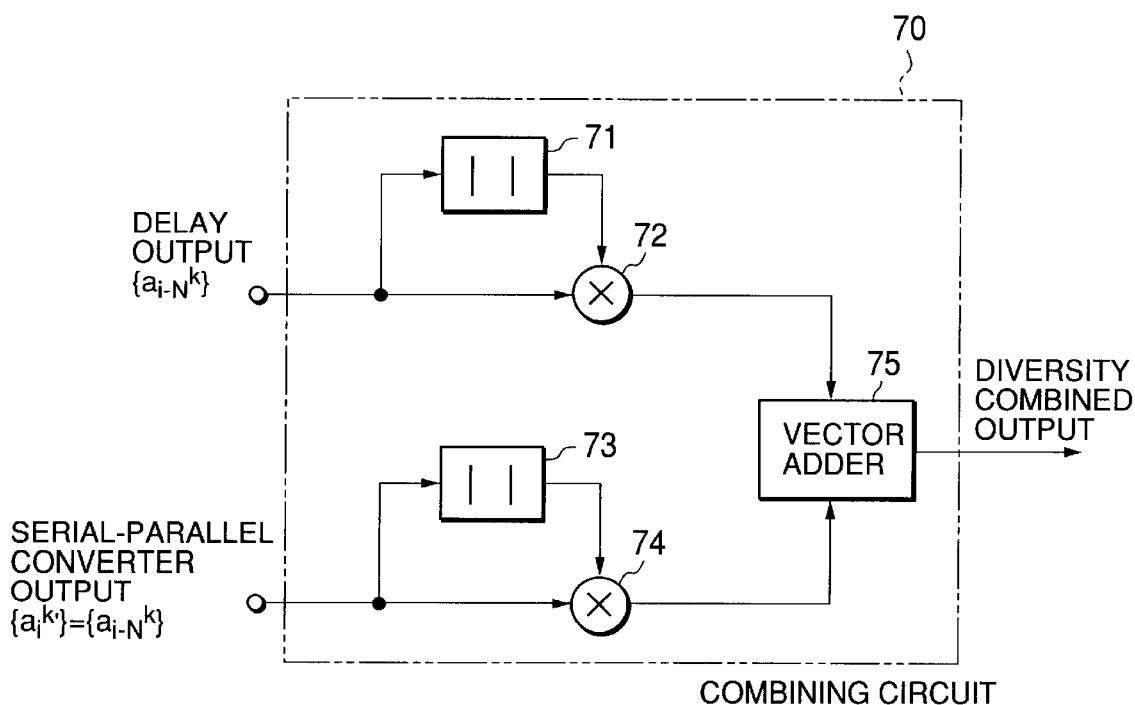
FIG. 7 is a block diagram of a combining circuit performing maximal ratio combining.

A demodulator according to a second preferred embodiment of the present invention is described next below with a reference to FIG. 7. FIG. 7 is a block diagram of a combining circuit 70 in a demodulator according to this second embodiment. It is to be noted that a demodulator according to this second embodiment differs from the demodulator 30 shown in FIG. 2 according, to the first embodiment in the substitution of a combining circuit 70 for combining circuits 54 and 55. Other components are the same or equivalent to those in the demodulator 30, and further description thereof is omitted below.

As shown in FIG. 7, this combining circuit 70 comprises absolute value detectors 71 and 73, multipliers 72 and 74, and vector adder 75. One absolute value detector 71 detects the absolute value of the data sequence $\{a_{i-N}^{k}\}$ output from shift register 52. Multiplier 72 then weights the data sequence $\{a_{i-N}^{k}\}$ by multiplying the absolute value $|a_{i-N}^{k}|$ from absolute value detector 71 with the data sequence $\{a_{i-N}^{k}\}$.

The other absolute value detector 73 similarly detects the absolute value of the data sequence $\{a_{i}^{k'}\}$ output from serial-parallel converter 51. Multiplier 74 then weights the data sequence $\{a_{i}^{k'}\}$ by multiplying the absolute value $|a_{i}^{k'}|$ from absolute value detector 73 with the data sequence $\{a_{i}^{k'}\}$.

Vector adder 75 then obtains the sum of vectors of the products supplied from multipliers 72 and 74.

Operation of combining circuit 70 is further described below. It will be remembered that combining circuits 54 and 55 in the first preferred embodiment perform equal gain diversity combining. However, it is not always necessary to employ equal gain combining, and maximal ratio combining, for example, can be alternatively used. A combining circuit 70 according to this second preferred embodiment of the invention therefore uses maximal ratio combining.

To accomplish this, the data sequences $\{a_{i-N}^{k}\}$ and $\{a_{i}^{k'}\}$ input to the combining circuit 70 are supplied to the absolute value detectors 71 and 73 to obtain the absolute values $|a_{i-N}^{k}|$ and $|a_{i}^{k'}|$. The multipliers 72 and 74 then multiply the data sequences $\{a_{i-N}^{k}\}$ and $\{a_{i}^{k'}\}$ by the absolute values $|a_{i-N}^{k}|$ and $|a_{i}^{k'}|$ to weight the data sequences $\{a_{i-N}^{k}\}$ and $\{a_{i}^{k'}\}$ according to their SNRs. The sum of vectors of the weighted signals is then obtained by the vector adder 75, and supplied to the branch metric calculator 61.

Figure 8:
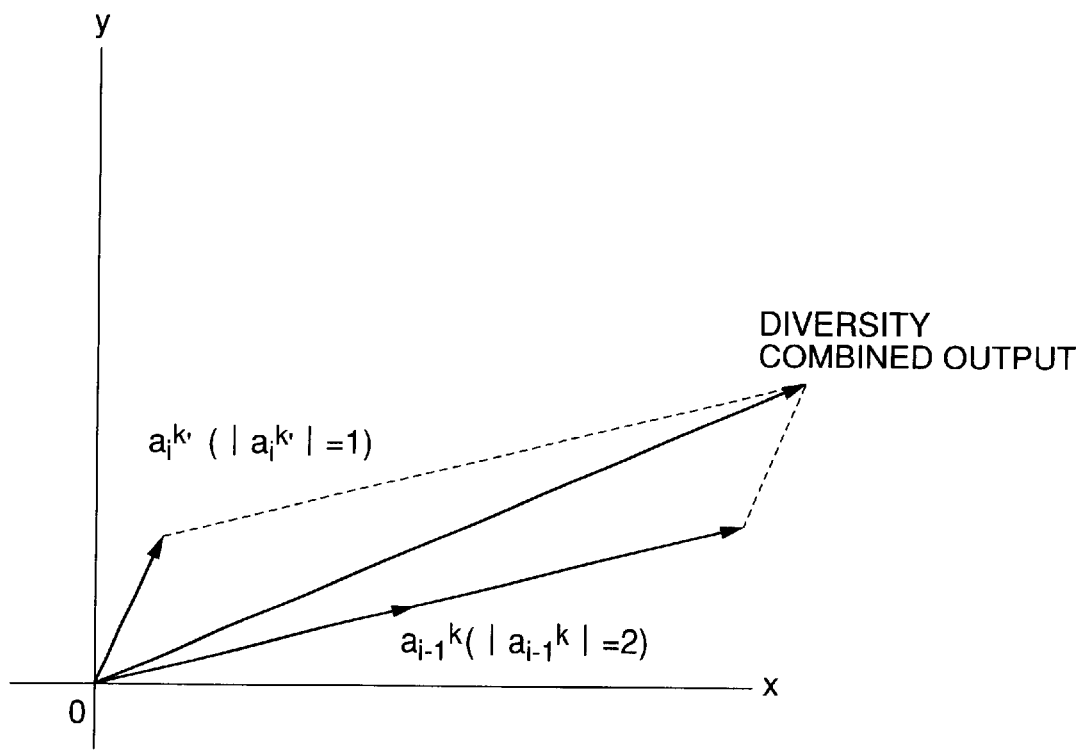
FIG. 8 is a graph used to describe weighting addition by the vector adder.

This weighting and vector addition operation is illustrated in FIG. 8. As shown in FIG. 8, if $|a_{i-N}^{k}|=2$ and $|a_{i}^{k'}|=1$, data sequence $\{a_{i}^{k'}\}$ will be multiplied by 1 and input to vector adder 75, but data sequence $\{a_{i-N}^{k}\}$ will be doubled as indicated by the bold arrow in FIG. 8. That is, high amplitude signals are more reliable and are therefore more heavily weighted. Low amplitude signals, however, are less reliable and weighting is therefore reduced. Weighting according to amplitude (signal strength) can thus improve the effects of diversity transmission. Data sequences $\{a_{i-N}^{k}\}$ and $\{a_{i}^{k'}\}$ are therefore first weighted and then added by vector adder 75 to obtain the combiner output.

A demodulator using a combining circuit 70 using maximal ratio combining according to this second preferred embodiment can thus achieve a greater diversity effect when compared with equal gain combining.

Embodiment 3

Figure 9:
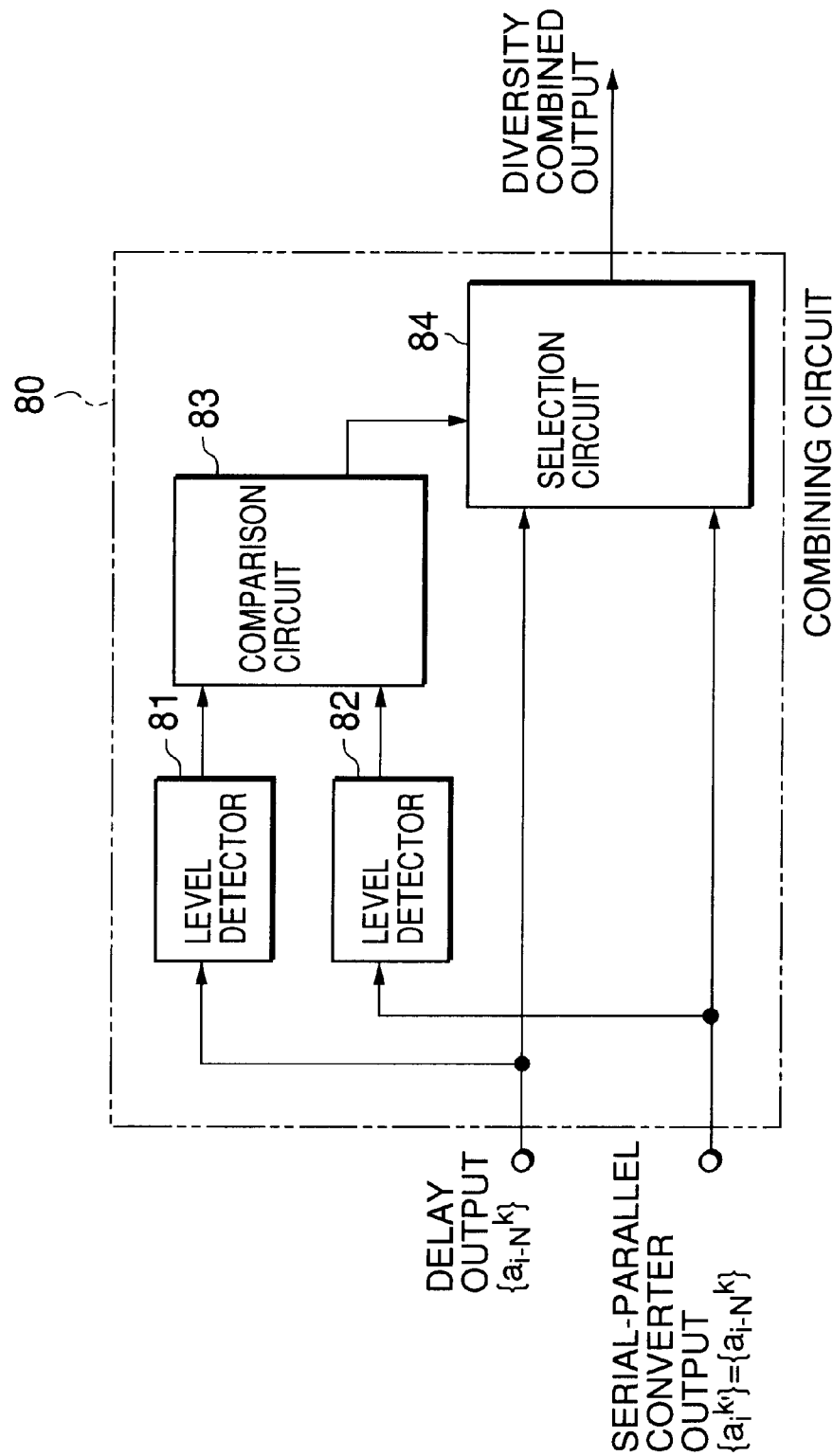
FIG. 9 is a block diagram of a combining circuit performing selective combining.

A demodulator according to a third preferred embodiment of the present invention is described next below with reference to FIG. 9. FIG. 9 is a block diagram of a combining circuit 80 in a demodulator according to this preferred embodiment. It is to be noted that a demodulator according to this third embodiment differs from the demodulator 30 shown in FIG. 2 according to the first embodiment in the substitution of a combining circuit 80 for combining circuits 54 and 55. Other components are the same or equivalent to those in the demodulator 30, and further description thereof is omitted below.

As shown in FIG. 9, this combining circuit 80 comprises level detectors 81 and 82, comparison circuit 83, and selection circuit (data sequence selector), 84. One level detector 81 detects the receiving level of the data sequence $\{a_{i-N}^{k}\}$ output from shift register 52. The other level detector 82 detects the receiving, level of the data sequence $\{a_{i}^{k'}\}$ output from serial-parallel converter 51. The comparison circuit 83 then compares the signal levels detected by and supplied from the level detectors 81 and 82. Based on the result supplied from the comparison circuit 83, the selection circuit 84 then selects either data sequence $\{a_{i}^{k'}\}$ or data sequence $\{a_{i-N}^{k}\}$.

Operation of a combining circuit 80 thus comprised is further described below.

The data sequences $\{a_{i-N}^{k}\}$ and $\{a_{i}^{k'}\}$ input to the combining circuit 80 are supplied to the selection circuit 84 and the level detectors 81 and 82. The level detectors 81 and 82 detect the signal level of the respective inputs as noted above, and pass the results to the comparison circuit 83. The comparison circuit 83 then compares the signal levels of the input data sequences $\{a_{i-N}^{k}\}$ and $\{a_{i}^{k'}\}$, and supplies a signal indicative of which data sequence has the higher signal strength to selection circuit 84. For example, if data sequence $\{a_{i-N}{}^k\}$ is stronger, the comparison circuit 83 passes 0 to the selection circuit 84; if data sequence $\{a_i{}^{k'}\}$ is stronger, a 1 is passed.

Based on the signal supplied from the comparison circuit 83, the selection circuit 84 selects and outputs data sequence $\{a_{i-N}{}^k\}$ or $\{a_i{}^{k'}\}$. In this exemplary embodiment the selection circuit 84 selects data sequence $\{a_{i-N}{}^k\}$ as the combiner output passed to the branch metric calculator 61 if a 0 is received from the comparison circuit 83, and selects data sequence $\{a_i{}^{k'}\}$ if a 1 is received.

A combining circuit 80 according to this preferred embodiment thus performs signal selection and combining by always outputting the data sequence received with the highest signal strength. It is to be noted that the level detectors 81 and 82, comparison circuit 83, and selection circuit 84 required for this selection and combining operation can be achieved on a smaller circuit scale than the vector adder 54a.

A combining circuit 80 according to this third preferred embodiment can thus accomplish the above selection and combining operation with a simpler circuit design than the combining circuit performing equal gain combining as described in the first embodiment above.

Embodiment 4

Figure 10:
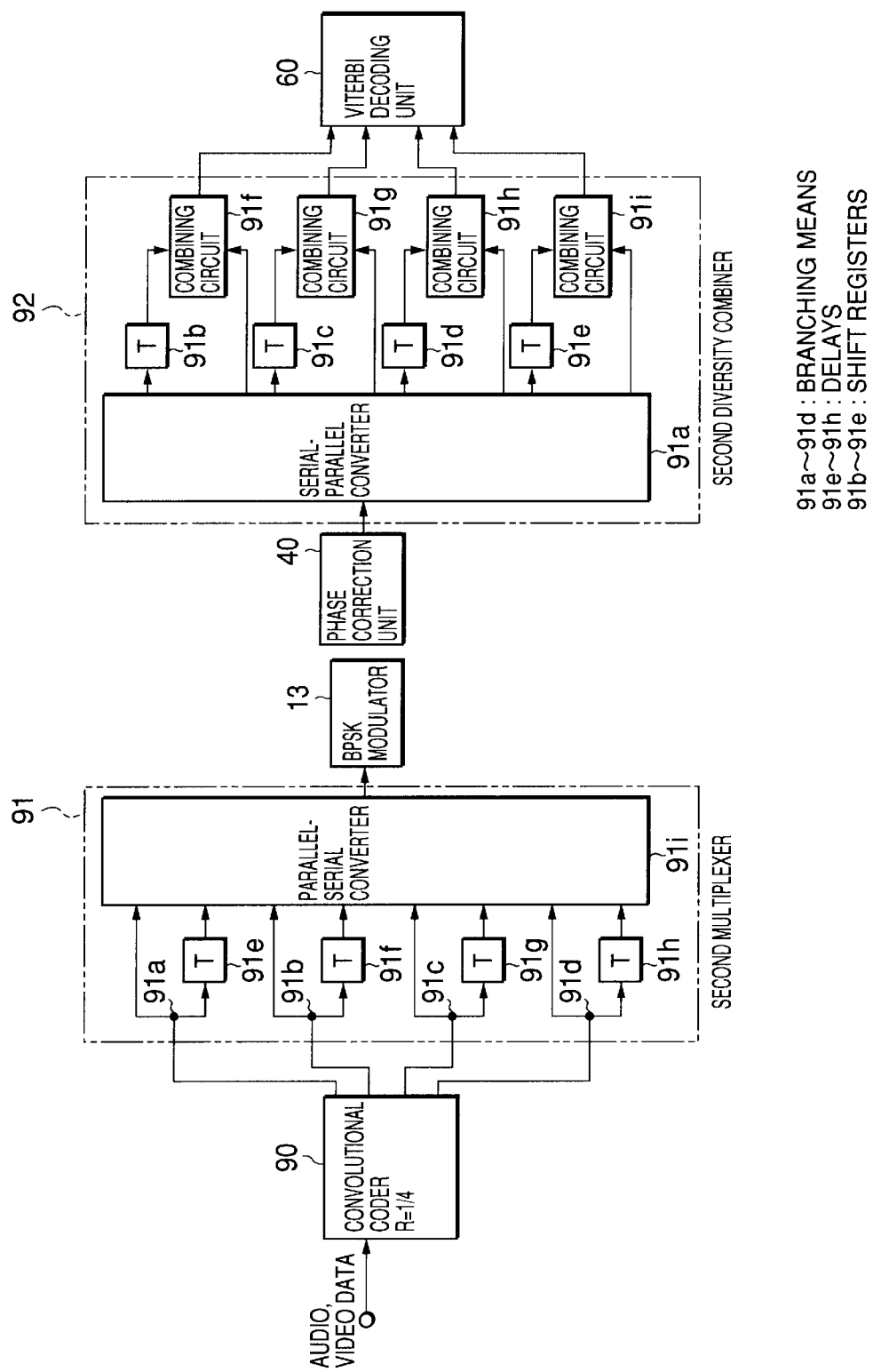
FIG. 10 is a block diagram of a communication system according to a fourth preferred embodiment of the present invention.

A communication system according to a fourth preferred embodiment of the present invention is described next below with reference to FIG. 10. FIG. 10 is a block diagram showing a convolutional encoder (second convolutional encoding means) 90, second multiplexer 91, and BPSK modulator (modulation means) 13 in the transmitter of this communication system; and the phase correction unit 40, a second diversity combiner 92, and Viterbi decoding unit 60 in the receiver.

It is to be noted that a communication system according to this fourth preferred embodiment of the invention differs from the communication system 1 shown in FIG. 1 in that convolutional encoder 11, multiplexer 12, and diversity combiner 50 are replaced by convolutional encoder 90, second multiplexer 91, and second diversity combiner 92. Other parts are the same as or equivalent to similar parts in the communication system 1 according to the first embodiment of the invention, and further description thereof is omitted below.

As shown in FIG. 10, the second multiplexer 91 comprises branching means 91a to 91d, delays 91e to 91h, and parallel-serial converter 91i. The four data sequences output from the convolutional encoder 90 are each branched in two by the branching means 91a to 91d. Of the resulting eight data sequences, second, fourth, sixth and eighth sequences are applied to and delayed by delays 91e to 91h, and first, third, fifth and seventh sequences are passed directly to the parallel-serial converter 91i. The parallel-serial converter 91i thus multiplexes first, third, fifth and seventh sequences with the delayed versions thereof, and outputs the resulting serial sequence to BPSK modulator 13.

The second diversity combiner 92 comprises serial-parallel converter 92a, shift registers 92b to 92e, and combining circuits 92f to 92i. The serial-parallel converter 92a separates the multiplexed data sequence output from the phase correction unit 40 into eight data sequences, and then parallel outputs to pass first, third, fifth and seventh sequences to shift registers 92b to 92e whereby they are delayed.

Combining circuit 92f then combines the delayed data sequence output from shift register 92b with the second data sequence from serial-parallel converter 92a, and outputs the result to Viterbi decoding unit 60.

Combining circuit 92g similarly combines the delayed data sequence output from shift register 92c with the fourth data sequence from serial-parallel converter 92a, and outputs the result to Viterbi decoding unit 60.

Combining circuit 92h similarly combines the delayed data sequence output from shift register 92d with the sixth data sequence from serial-parallel converter 92a, and outputs the result to Viterbi decoding unit 60.

Combining circuit 92i similarly combines the delayed data sequence output from shift register 92e with the eighth data sequence from serial-parallel converter 92a, and outputs the result to Viterbi decoding unit 60.

While the coding rate R of the convolutional encoder 11 in the above-described first preferred embodiment is R=½, it will be obvious that the present invention shall not be so limited. For example, a coding rate of R=¾ can be used by applying punctured coding for Viterbi decoding, which is achieved by periodically eliminating a part of the convolutional code bits in order to increase the coding rate. Transmission efficiency can also be improved by using punctured coding to increase the coding rate. The coding rate R of the convolutional encoder 90 shown in FIG. 10 according to this fourth embodiment is therefore R=¼. As a result, error correction can also be improved compared with an R=½ coding rate.

The four data sequences output from convolutional encoder 90 are branched into eight sequences by branching means 91a to 91d of the second multiplexer 91, and input to the parallel-serial converter 91i. These eight data sequences are multiplexed to one multiplexed data-sequence and output to BPSK modulator 13. The data rate of the parallel-serial converter 91i output is thus eight times the data rate of the input data sequence. The serial-parallel converter 92a then separates the one multiplexed data sequence into eight data sequences. The data rate of serial-parallel converter 92a output is therefore ⅛ the data rate of the input data sequence.

Embodiment 5

Figure 11:
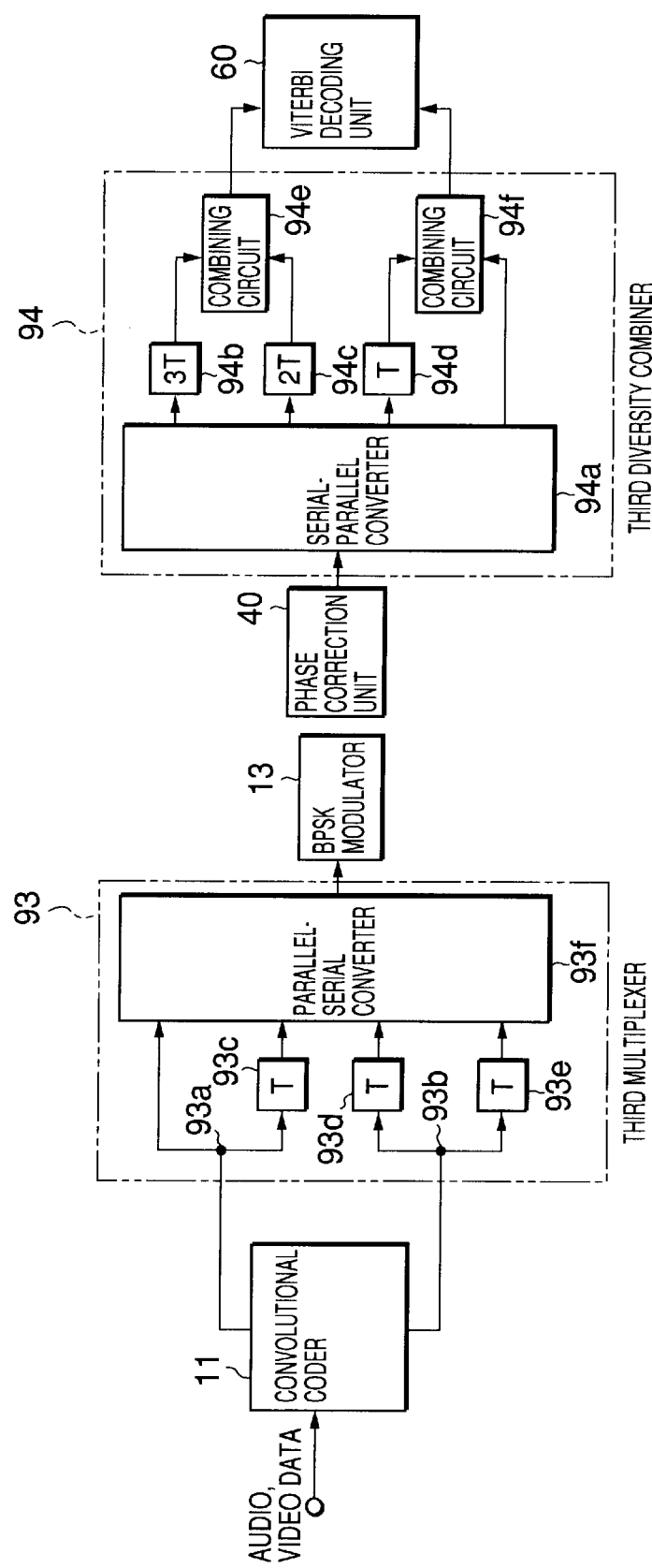
FIG. 11 is a block diagram of a communication system according to a fifth preferred embodiment of the present invention.

A communication system according to a fifth preferred embodiment of the present invention is described next below with reference to FIG. 11. FIG. 11 is a block diagram showing a convolutional encoder 11, third multiplexer 93, and BPSK modulator 13 in the transmitter of this communication system; and the phase correction unit 40, third diversity combiner 94, and Viterbi decoding unit 60 in the receiver.

It is to be noted that a communication system according to this fifth preferred embodiment of the invention differs from the communication system 1 shown in FIG. 1 in that multiplexer 12 and diversity combiner 50 are replaced by third multiplexer 93, and third diversity combiner 94. Other parts are the same as or equivalent to similar parts in a communication system 1 according to the first embodiment of the invention, and further description thereof is omitted below.

As shown in FIG. 11, this third multiplexer 93 comprises branching means 93a and 93b, delays 93c to 93e, and parallel-serial converter 93f. The two data sequences output from the convolutional encoder 11 are each branched in two by the branching means 93a and 93b. Delays 93c to 93e delay the second, third, and fourth data sequences of the four sequences passed from branching means 93a and 93b by T, 2T, and 3T (where T is a specific time), respectively. The parallel-serial converter 93f multiplexes without changing the order the first data sequence branched from branching means 93a, and the three data sequences delayed and output by the delays 93c to 93e, and outputs the multiplexed sequence to BPSK modulator 13.

The third diversity combiner 94 of the receiver comprises a serial-parallel converter 94a, shift registers 94b to 94d, and combining circuits 94e and 94f. The serial-parallel converter 94a separates the multiplexed data sequence from the phase correction unit 40 into four data sequences, and parallel outputs these four sequences to shift registers 94b to 94d and combining circuit 94f. The shift registers 94b to 94d delay the first to third sequences from the serial-parallel converter 94a 3T, 2T, and T (where T is a specific time), respectively. Combining circuit 94e then combines the data sequences from shift registers 94b and 94c, and outputs to the Viterbi decoding unit 60. Combining circuit 94f combines the data sequence from shift register 94d and the fourth data sequence output from serial-parallel converter 94a, and outputs to the Viterbi decoding unit 60.

It will be remembered that the delay time applied in the transmitter 10 and receiver 20 in the first embodiment shown in FIG. 1 was a time T equal to an N bit data period, but the invention shall not be so limited. It is alternatively possible as described in this fifth preferred embodiment for the third multiplexer 93 to delay the four data sequences respective delay times 0, T, 2T, and 3T, and for the third diversity combiner 94 to then match the data timing with delay times of 3T, 2T, T, and 0. By thus applying a different delay time to each data sequence, the diversity effect of a time diversity system can be enhanced.

Embodiment 6

Figure 12:
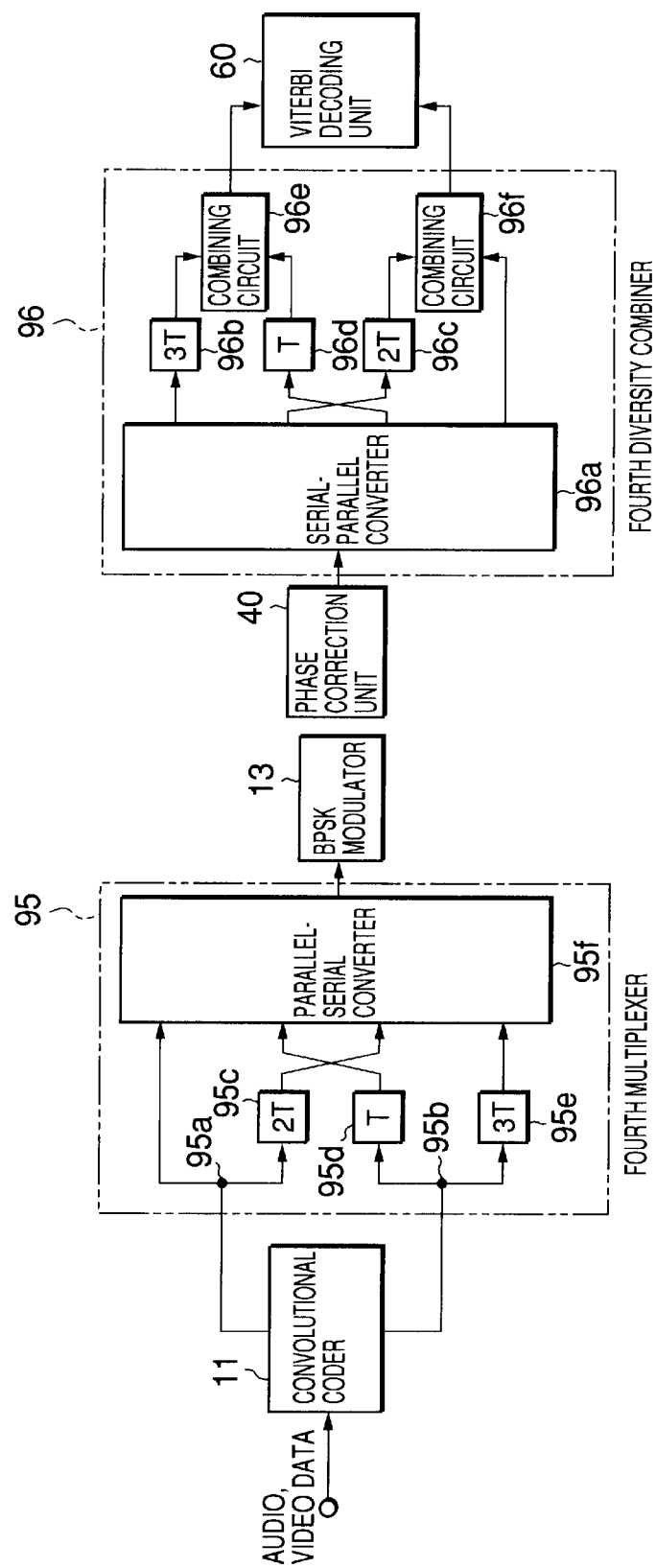
FIG. 12 is a block diagram of a communication system according to a sixth preferred embodiment of the present invention.

A communication system according to a sixth preferred embodiment of the present invention is described next below with reference to FIG. 12. FIG. 12 is a block diagram showing a convolutional encoder 11, fourth multiplexer 95, and BPSK modulator 13 in the transmitter of this communication system; and the phase correction unit 40, fourth diversity combiner 96, and Viterbi decoding unit 60 in the receiver.

It is to be noted that a communication system according to this sixth preferred embodiment of the invention differs from the communication system 1 shown in FIG. 1 in that multiplexer 12 and diversity combiner 50 are replaced by fourth multiplexer 95 and fourth diversity combiner 96, respectively. Other parts are the same as or equivalent to similar parts in a communication system 1 according to the first embodiment of the invention, and further description thereof is omitted below.

As shown in FIG. 12, this fourth multiplexer 95 comprises branching means 95a and 95b, delays 95c to 95e, and parallel-serial converter 95f. The two data sequences output from the convolutional encoder 11 are each branched in two by the branching means 95a and 95b. Delays 95c to 95e delay the second, third, and fourth data sequences of the four sequences passed from branching means 95a and 95b by 2T, T, and 3T (where T is a specific time), respectively. The parallel-serial converter 95f multiplexes the first data sequence branched from branching means 95a, and the three data sequences delayed and output by the delays 95c to 95e after first reversing the order of the second and third data sequences, and outputs the multiplexed sequence to BPSK modulator 13.

The fourth diversity combiner 96 of the receiver comprises a serial-parallel converter 96a, shift registers 96b to 96d, and combining circuits 96e and 96f. The serial-parallel converter 96a separates the multiplexed data sequence from the phase correction unit 40 into four data sequences, and parallel outputs these four sequences to shift registers 96b to 96d and combining circuit 96f. The shift registers 96b to 96d delay the first to third sequences output from the serial-parallel converter 96a by 3T, 2T, and T (where T is a specific time), respectively. Combining circuit 96e then combines the data sequences output from shift registers 96b and 96d, and outputs to the Viterbi decoding unit 60. Combining circuit 96f combines the data sequence output from shift register 96c and the fourth data sequence output from serial-parallel converter 96a, and outputs to the Viterbi decoding unit 60.

It will be remembered that the delay time applied in the transmitter 10 and receiver 20 in the first embodiment shown in FIG. 1 was a time T equal to an N bit data period, but the invention shall not be so limited. It is alternatively possible as described in this sixth preferred embodiment for the fourth multiplexer 95 to delay the four data sequences 0, 2T, T, and 3T, and for the fourth diversity combiner 96 to then match the data timing with delay times of 3T, T, 2T, and 0.

It will be noted that the order of the second and third data sequences is reversed in this case. As a result, the delay within a same data sequence is 2T, and performance improvement by means of a time diversity system is greater compared with a delay time of T when change in the received signal level as a result of fading or other factors is slight.

Embodiment 7

Figure 13:
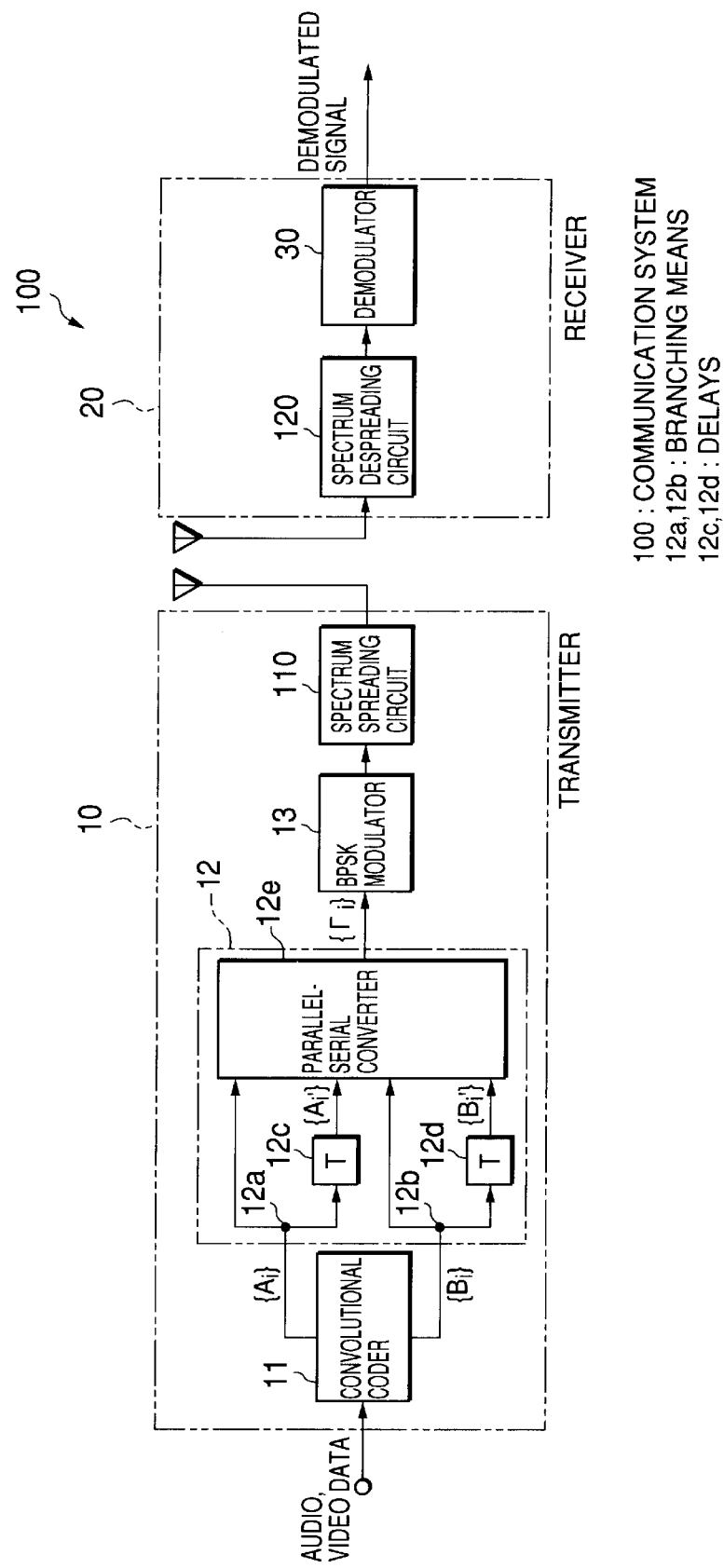
FIG. 13 is a block diagram of a communication system according to a seventh preferred embodiment of the present invention.

A communication system according to a seventh preferred embodiment of the present invention is described next below with reference to FIG. 13. FIG. 13 is a block diagram of a communication system 100 according to this seventh embodiment. A communication system 100 according to this seventh embodiment differs from the first embodiment shown in FIG. 1 in that the transmitter 10 further comprises a spectrum spreading circuit 110 for spectrum spreading the modulated signal output from the BPSK modulator 13 to obtain the transmission signal, and the receiver 20 further comprises a spectrum despreading circuit 120 for despreading the received signal to pass it to the demodulator 30. Other parts are the same as or equivalent to similar parts in a communication system 1 according to the first embodiment of the invention. It is to be noted that like parts in this and the first embodiment are identified by like reference numeral, and further description thereof is thus omitted below.

Operation of a communication system 100 according to this seventh preferred embodiment is described next below.

As in the first preferred embodiment above, audio, video, and/or other data is converted to a digital signal by, for example, an audio encoder to generate the data sequence to be transmitted. This data sequence is then convolutional coded by a convolutional encoder 11 at a coding rate of R=½. Each of the two data sequences output from the convolutional encoder 11 are further branched into two sequences. One of two branched data sequences is passed directly to the parallel-serial converter 12e. The other is passed to a corresponding delay 12c or 12d.

The delays 12c and 12d delay the input data sequences a delay time T equivalent to an N bit data period, and then pass the delayed sequences to the parallel-serial converter 12e. The parallel-serial converter 12e converts the four parallel input data sequences to a serial data sequence at a data rate four times that of the input data rate. BPSK modulator 13 then BPSK modulates the parallel-serial converter 12e output, and supplies the modulated signal to the spectrum spreading circuit 110 for spectrum spreading.

Figure 14:
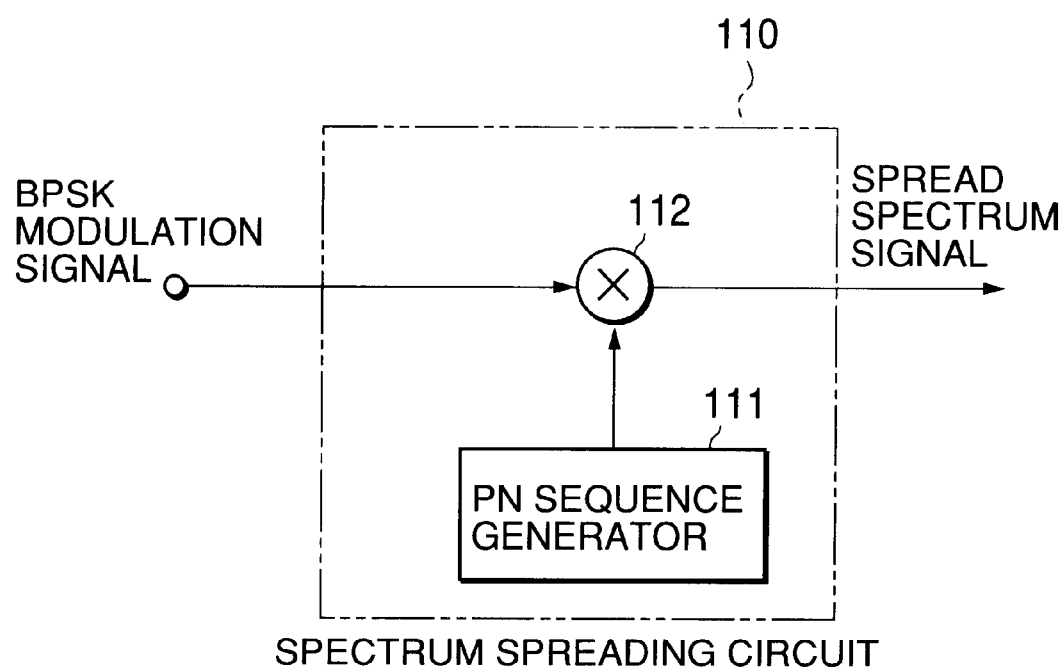
FIG. 14 is a block diagram of the spectrum spreading circuit in FIG. 13.

As shown in FIG. 14 the spectrum spreading circuit 110 comprises a PN sequence generator 111 for generating a PN sequence, and a multiplier 112 for multiplying a supplied BPSK modulated signal with the PN sequence. The BPSK modulated signal input to the spectrum spreading circuit 110 is passed to the multiplier 112. The PN sequence generator 111 supplies a PN sequence with a data rate higher than the modulated signal data rate to the multiplier 112, which then multiplies this PN sequence by the BPSK modulated signal to generate a spread spectrum signal.

Figure 15:
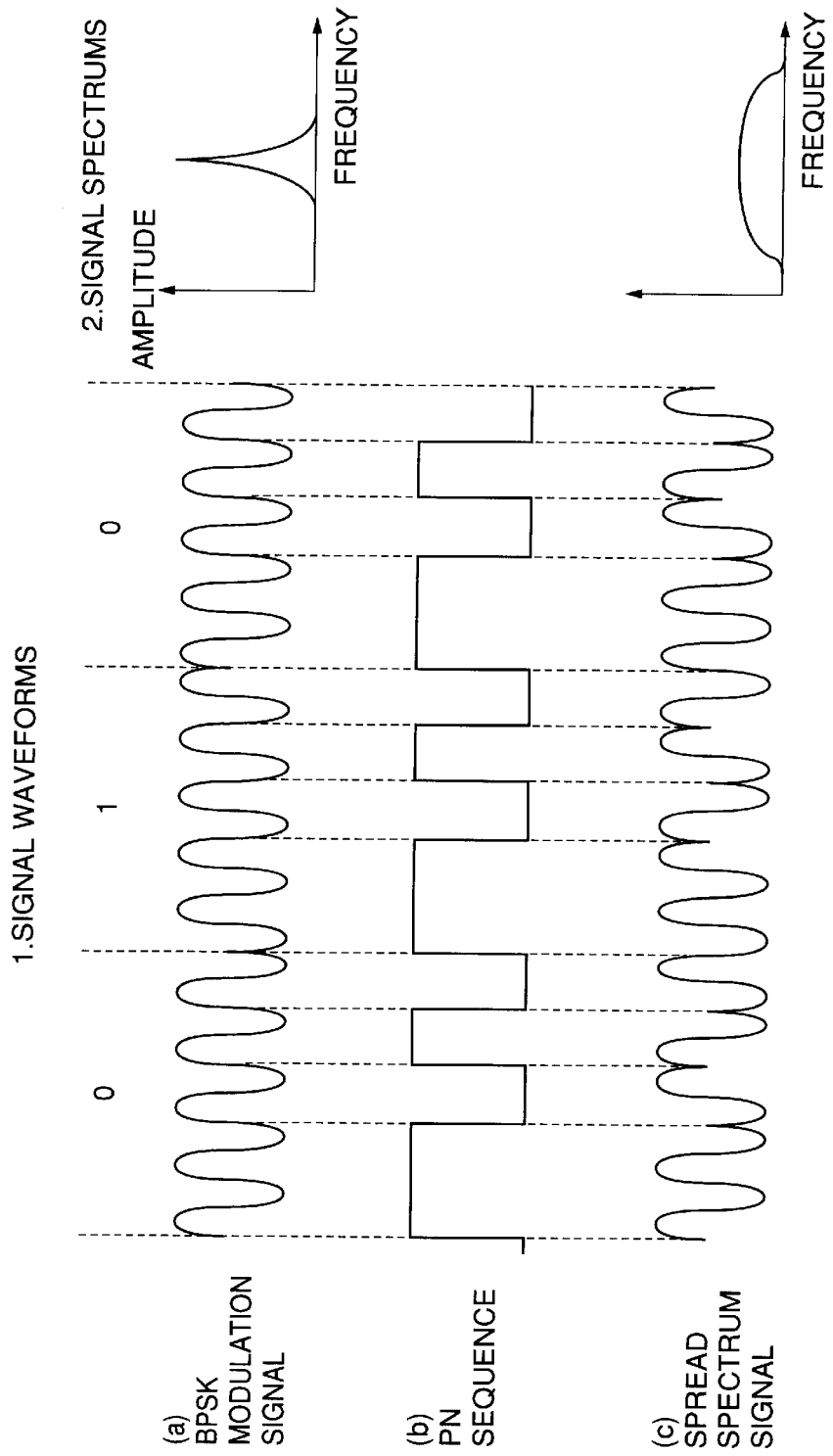
FIG. 15 is a waveform diagram of the BPSK modulated signal, PN sequence, and spread spectrum signal, and corresponding signal spectrums.

FIG. 15 shows exemplary signal waveforms of a BPSK modulated signal, PN sequence, spread spectrum signal, and corresponding signal spectrums. The narrow band BPSK modulated signal shown in (a) is multiplied by the PN sequence shown in (b) with a rate higher than the modulated data rate to obtain the spread spectrum signal shown in (c). As shown in FIG. 15, the spread spectrum signal is a wideband signal compared with the BPSK modulated signal.

The spread spectrum signal output from the spectrum spreading circuit 110 is power amplified by, for example, a radio frequency amplifier (not shown in the figure) and then transmitted. The transmitted signal is received by receiver 20, power amplified by, for example, a radio frequency amplifier (not shown in the figure) and then supplied to the spectrum despreading circuit 120 for despreading.

Figure 16:
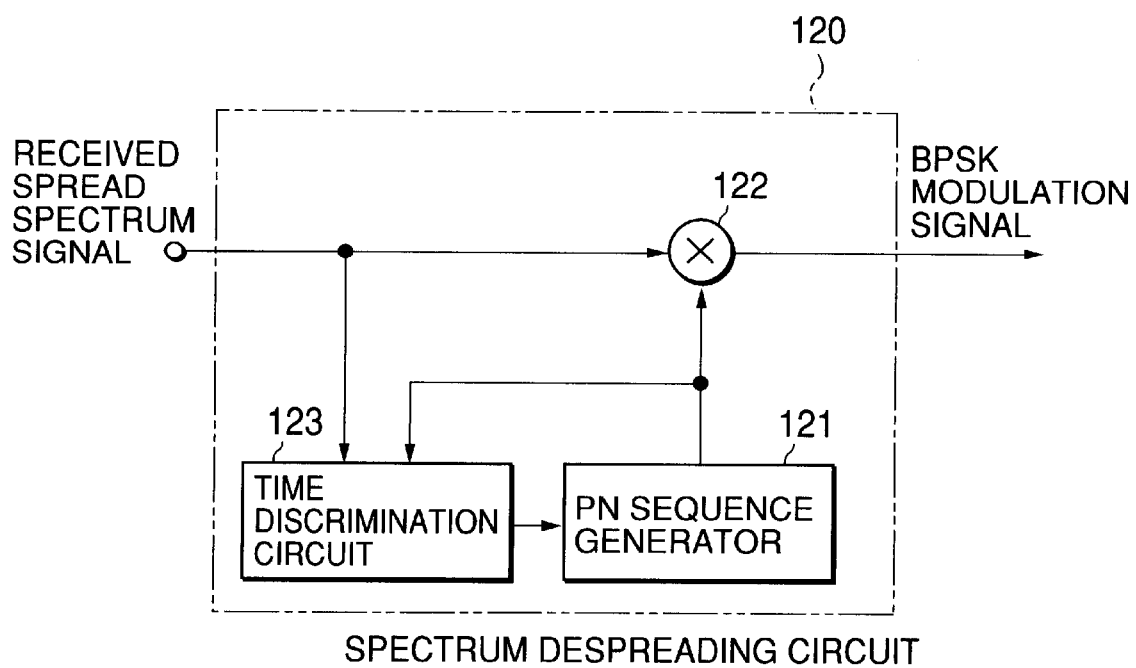
FIG. 16 is a block diagram of the despreading circuit in FIG. 13.

As shown in FIG. 16, this spectrum despreading circuit 120 comprises a PN sequence generator 121 for generating a PN sequence, a multiplier 122 for multiplying the received spread spectrum signal and the PN sequence input from the PN sequence generator 121, and a time discrimination circuit 123 for controlling synchronization of the PN output sequence from PN sequence generator 1.21 with the PN sequence of the transmitter 10.

The received spread spectrum signal input to the spectrum despreading circuit 120 is input to the time discrimination circuit 123, which controls the PN sequence generator 121 to synchronize the PN sequence output therefrom with the PN sequence used by the transmitter 10. The received spread spectrum signal is also input to the multiplier 122, which thus multiplies the input spread spectrum signal by the synchronized PN sequence output from the PN sequence generator 121 to restore the BPSK modulated signal.

Figure 17:
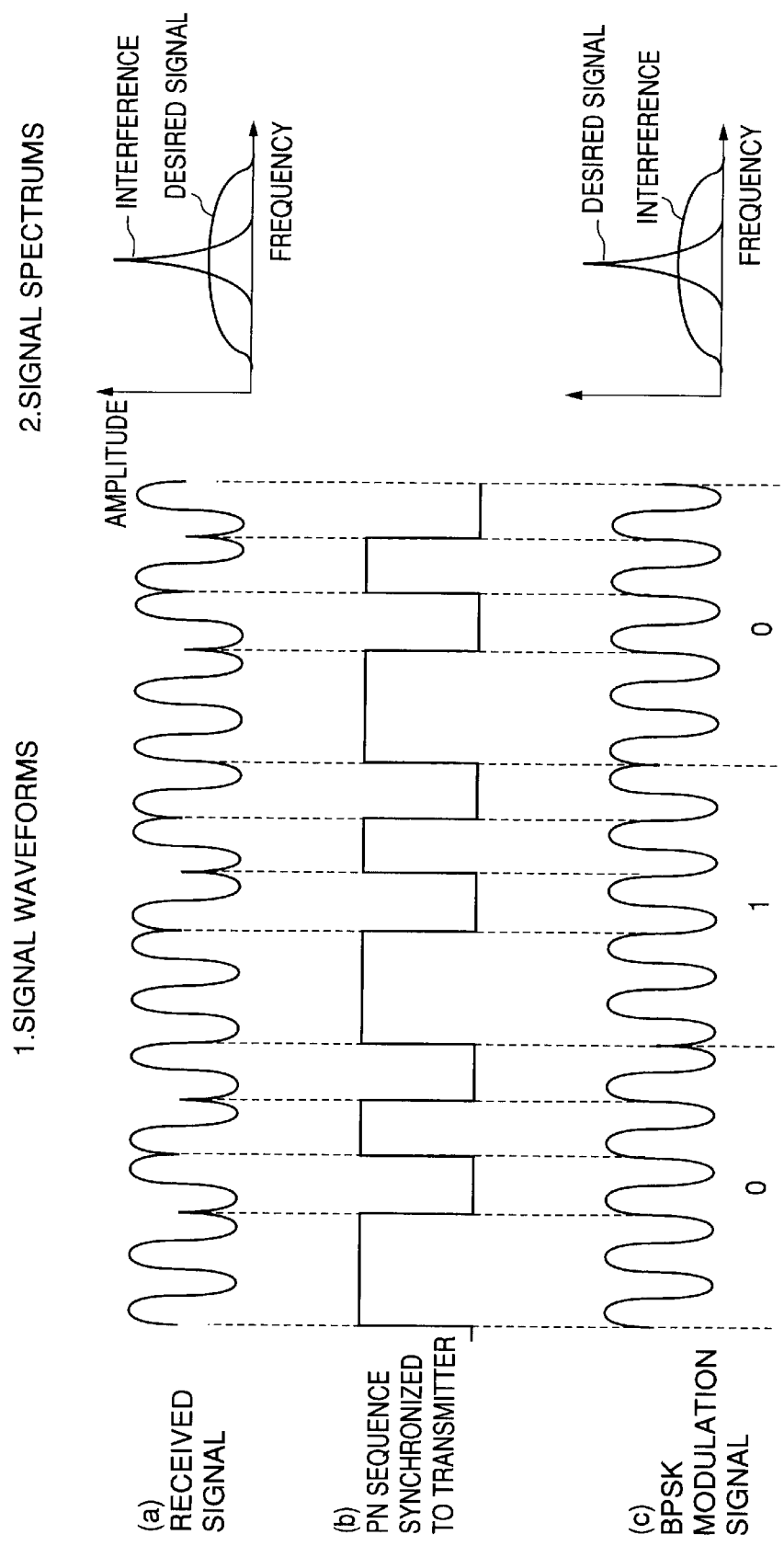
FIG. 17 is a waveform diagram of the received signal, PN sequence, and BPSK modulated signal, and corresponding signal spectrums.
Figure 18:
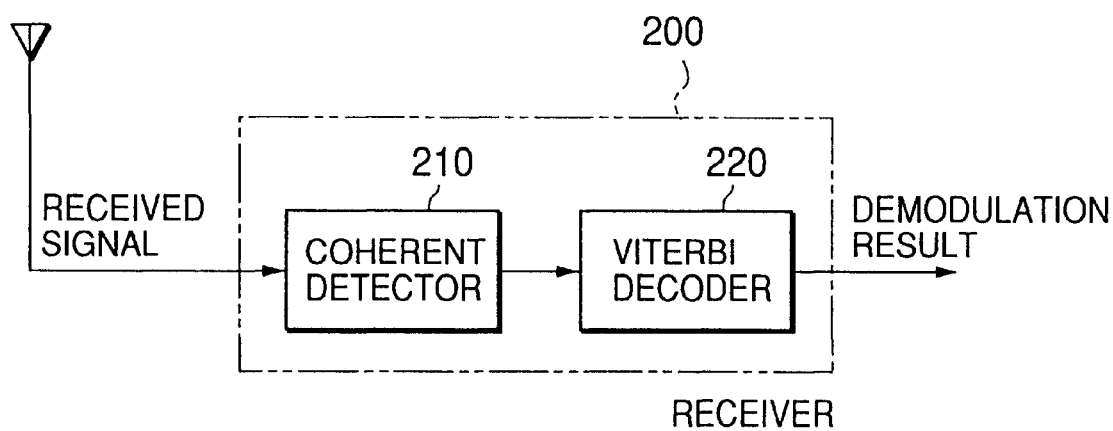
FIG. 18 is a block diagram of a receiver having a built in decoder according to the related art.
Figure 19A:
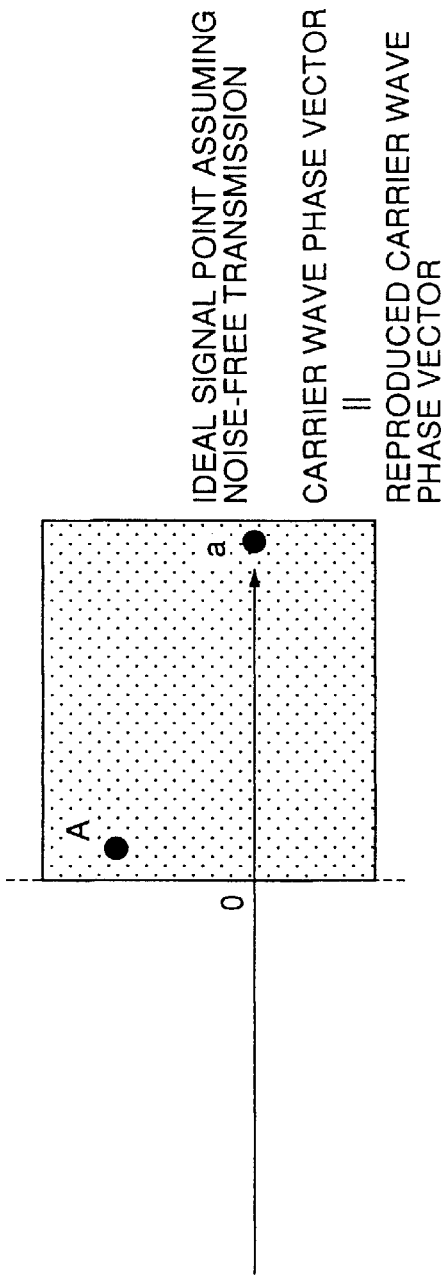
FIGS. 19A and 19B are used to describe symbol evaluation by the coherent detector in FIG. 18.
Figure 19B:
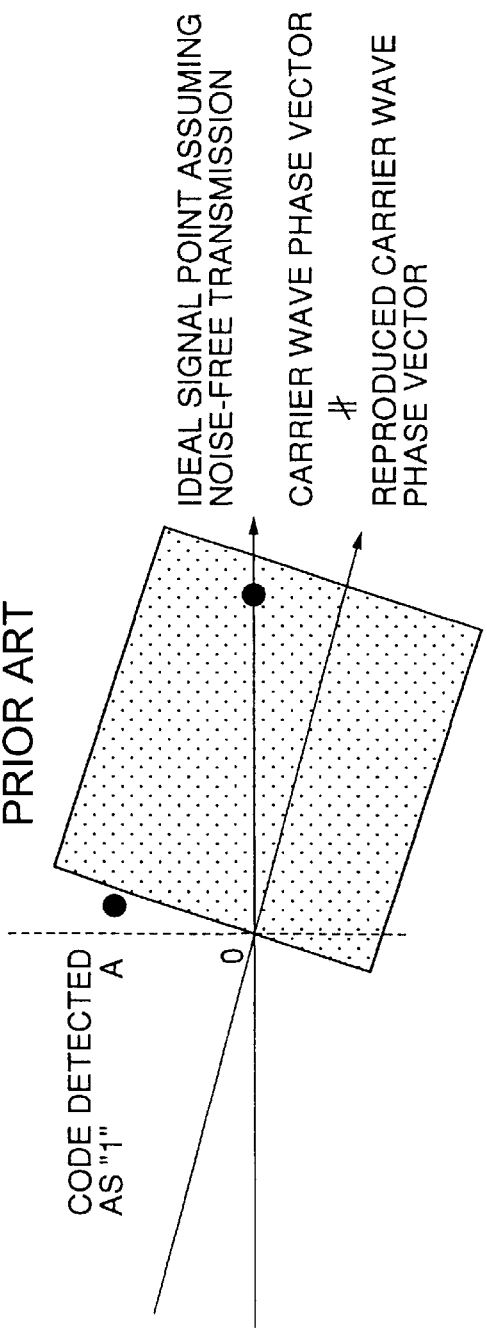
Figure 20:
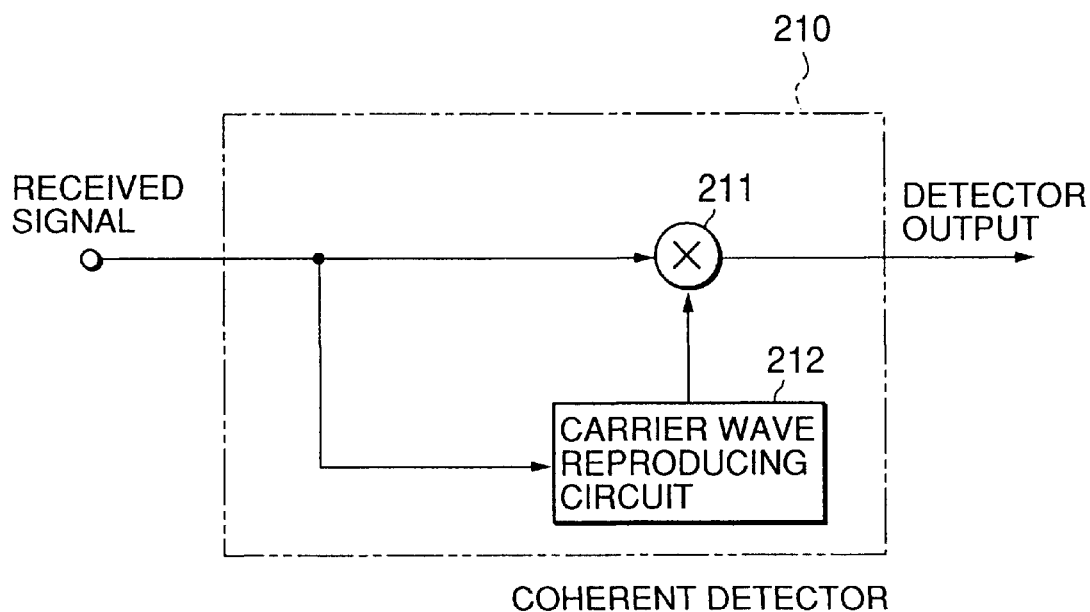
FIG. 20 is a block diagram of a typical coherent detector.
Figure 21:
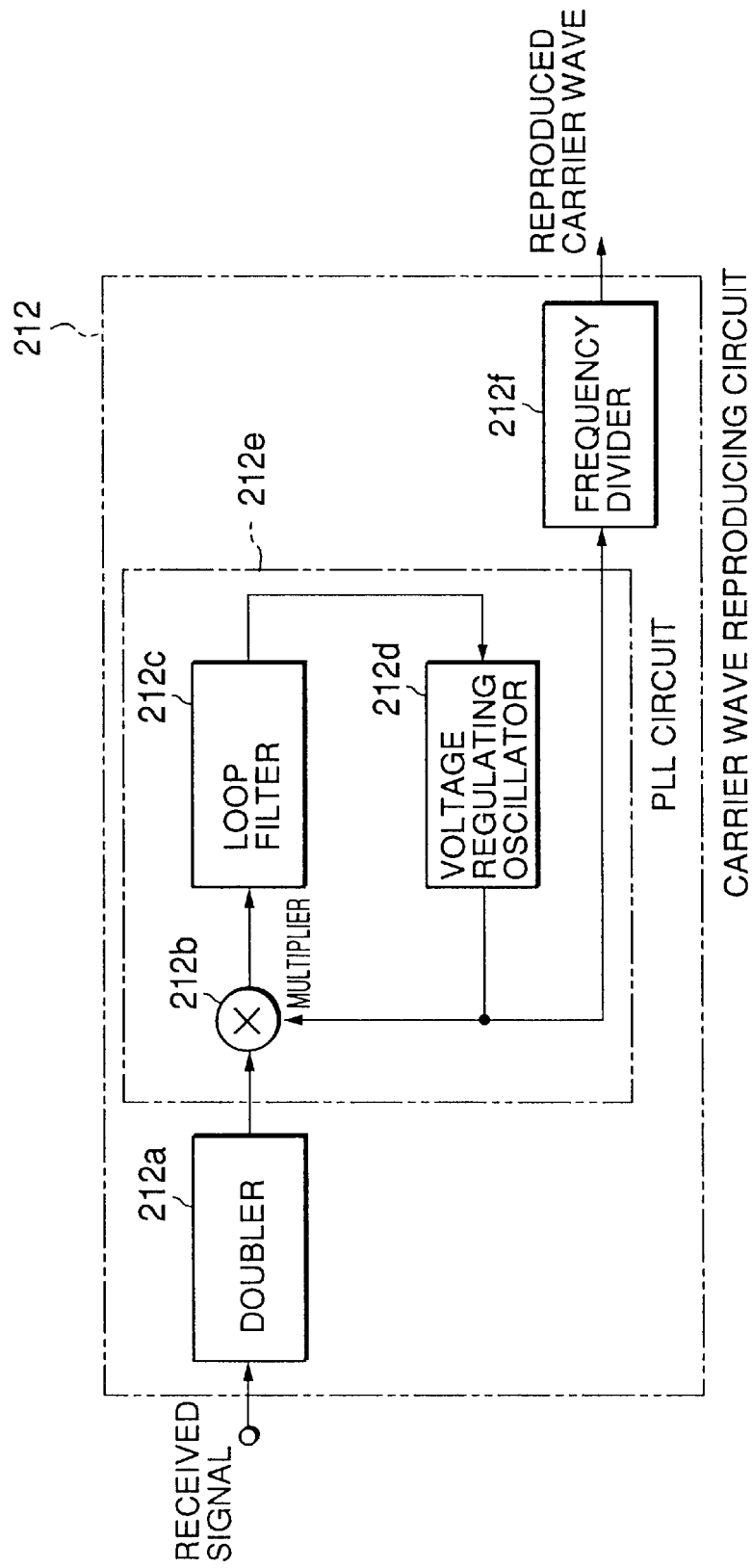
FIG. 21 is a block diagram of a typical carrier recovery circuit.
Figure 22A:
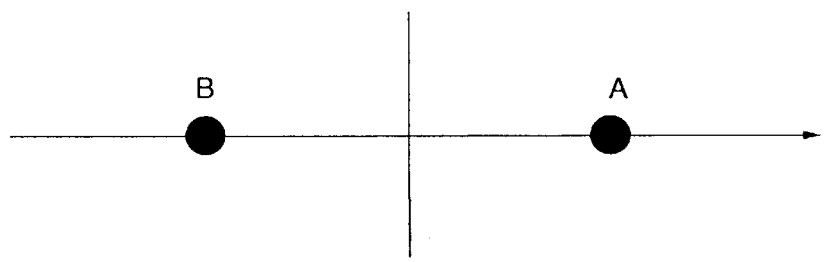
FIGS. 22A to 22D are signal space diagram showing the distribution of a received signal.
Figure 22B:
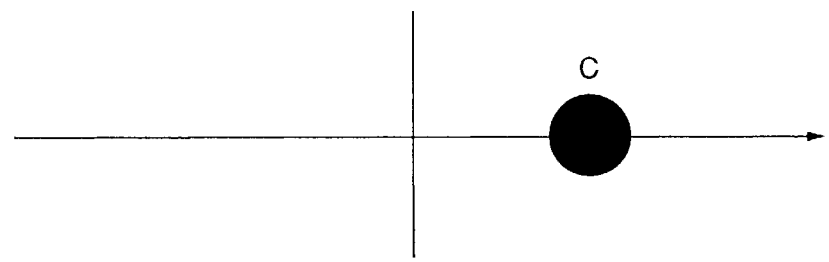
Figure 22C:
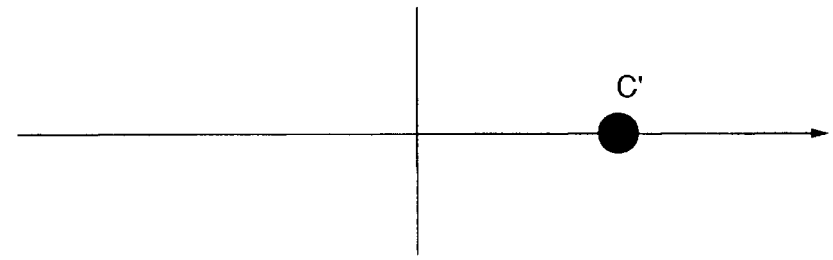
Figure 22D:
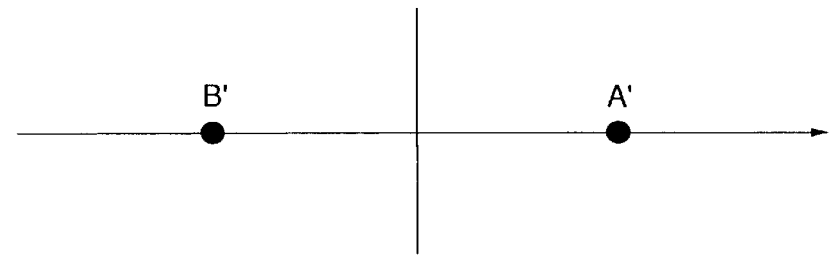
Figure 23:
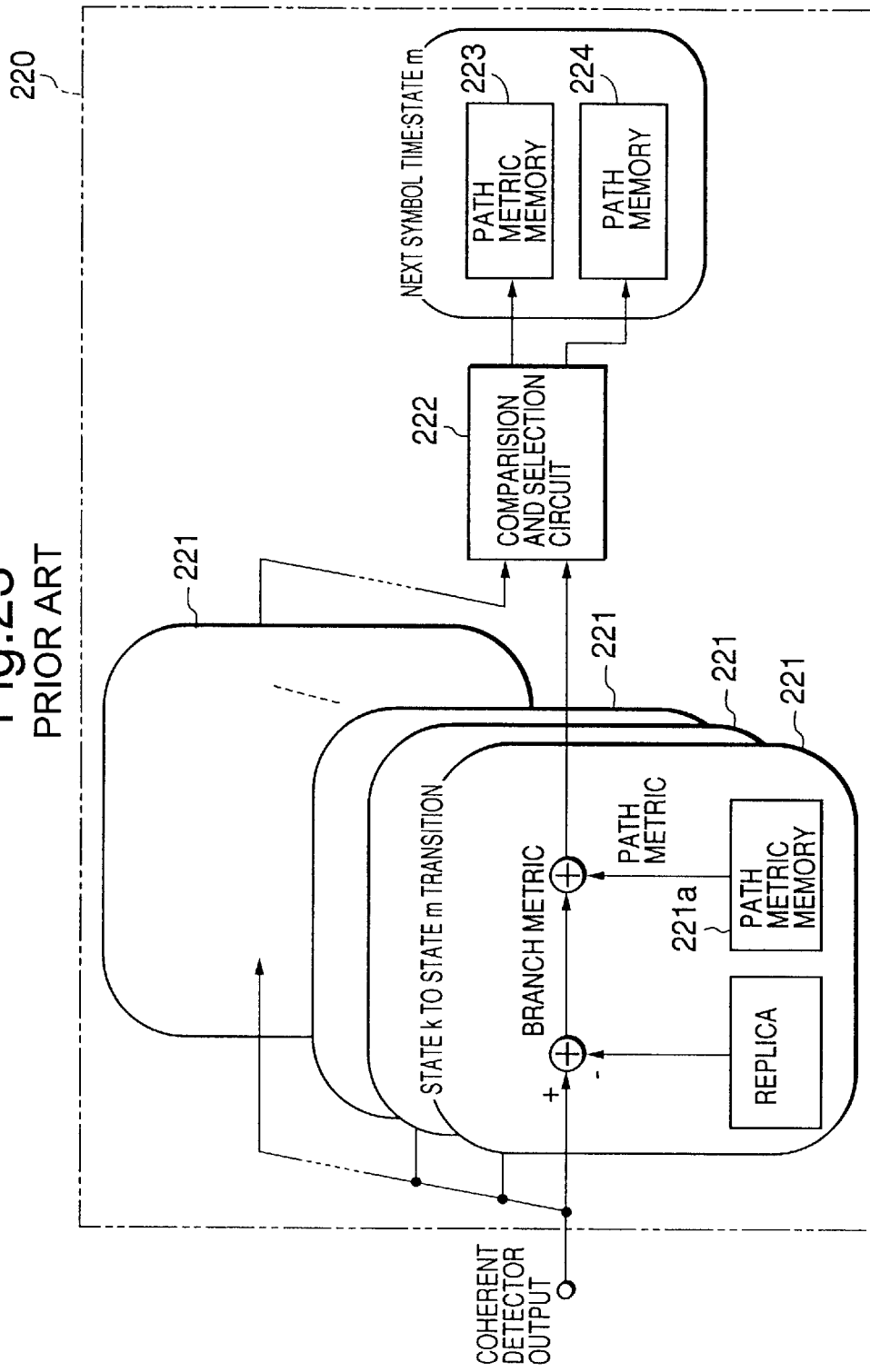
FIG. 23 is a block diagram of a typical Viterbi decoder.
Figure 24:
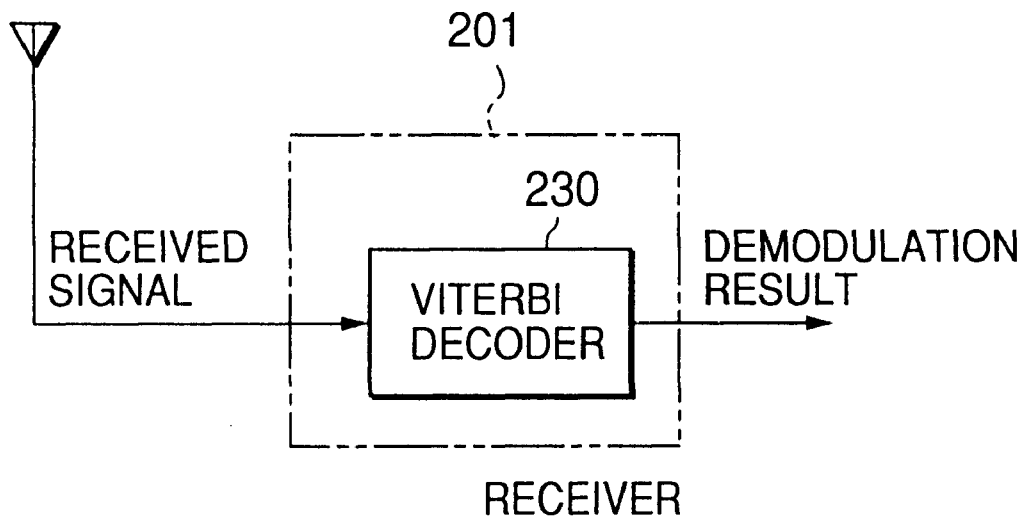
FIG. 24 is a block diagram of a receiver having a typical Viterbi decoder with an internal coherent detection function according to the related art.
Figure 25:
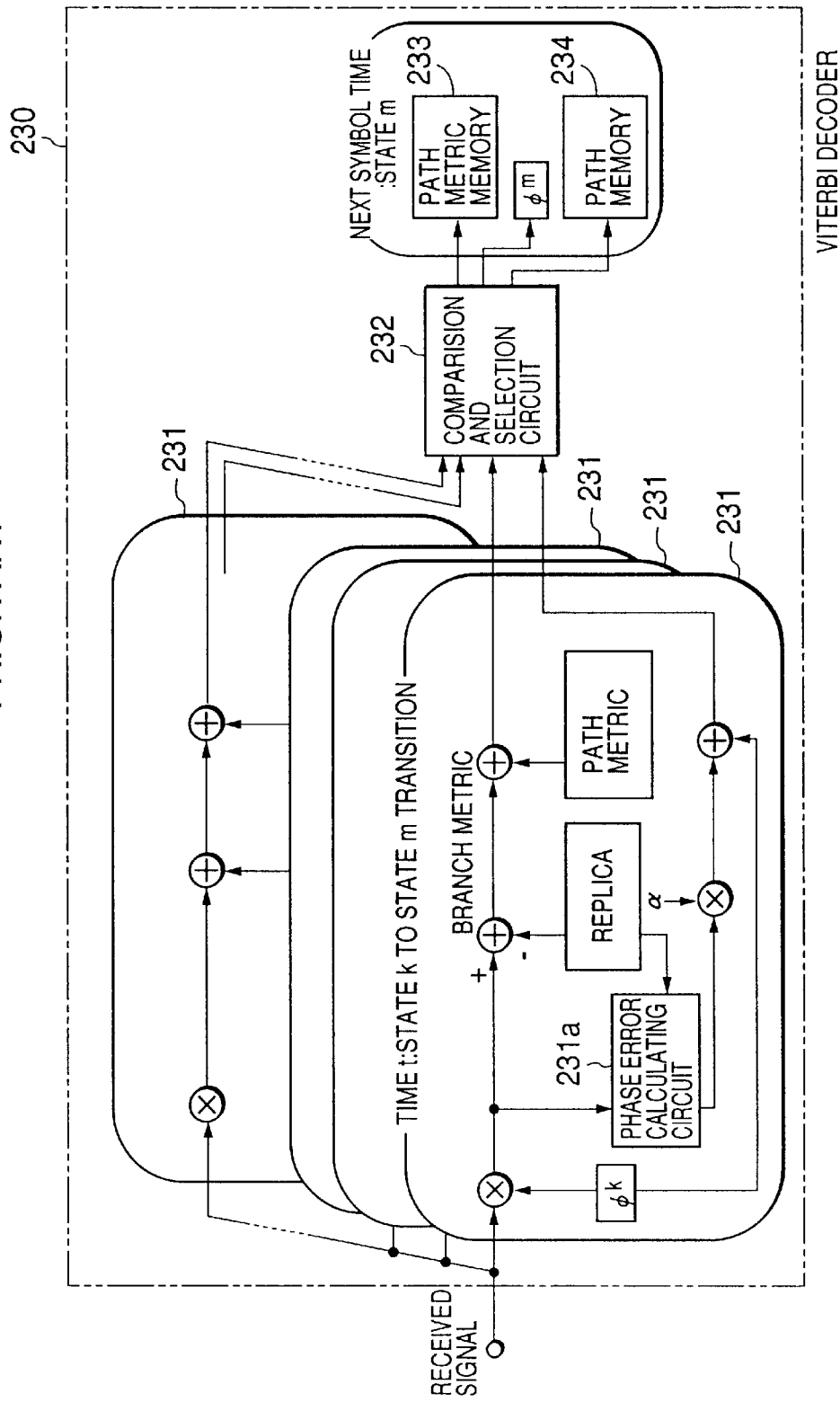
FIG. 25 is a block diagram showing a state k to state m transition in the typical Viterbi decoder with an internal coherent detection function shown in FIG. 24.
Figure 26:
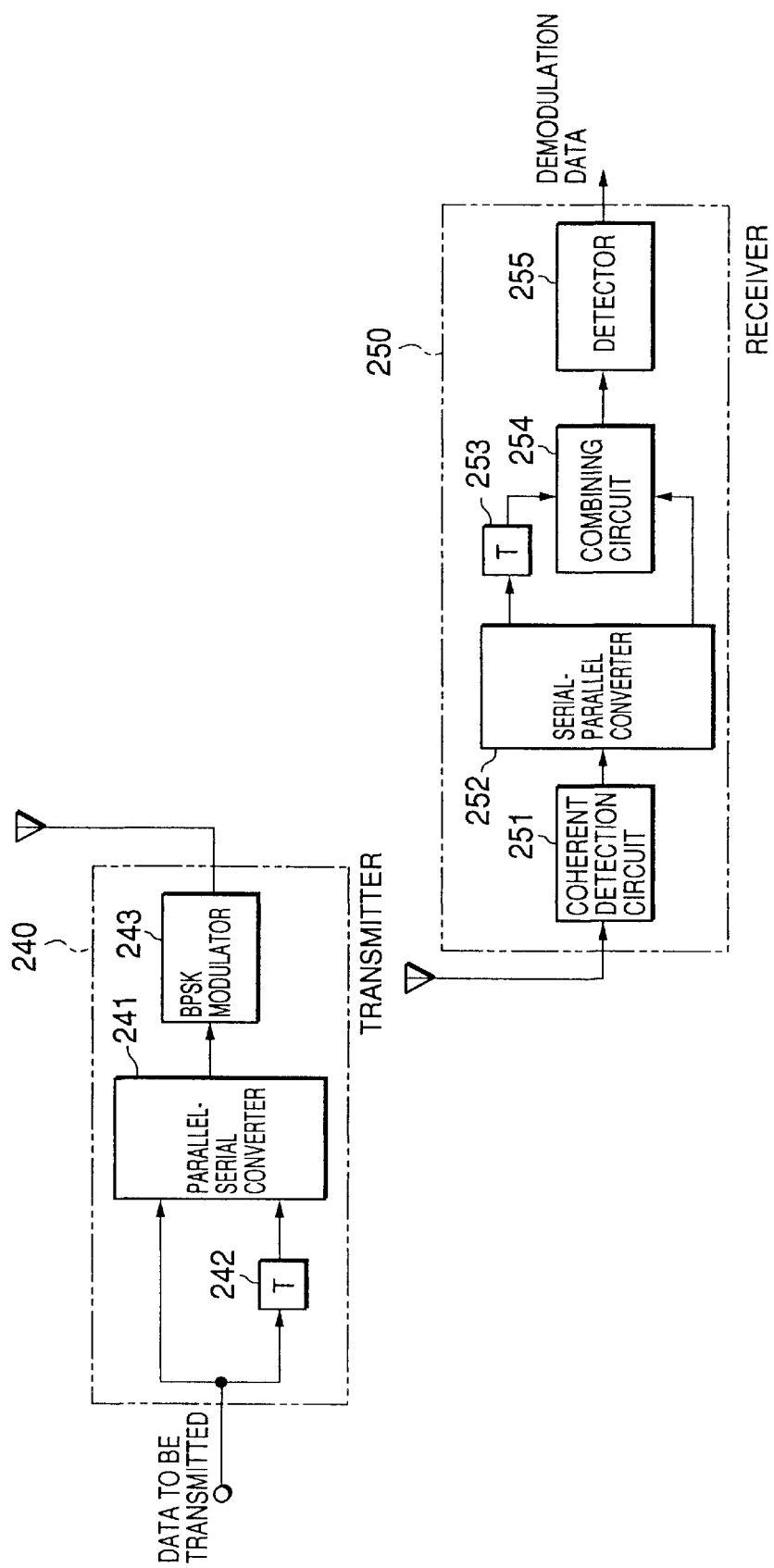
FIG. 26 is a block diagram of a typical time diversity system.
Figure 27:
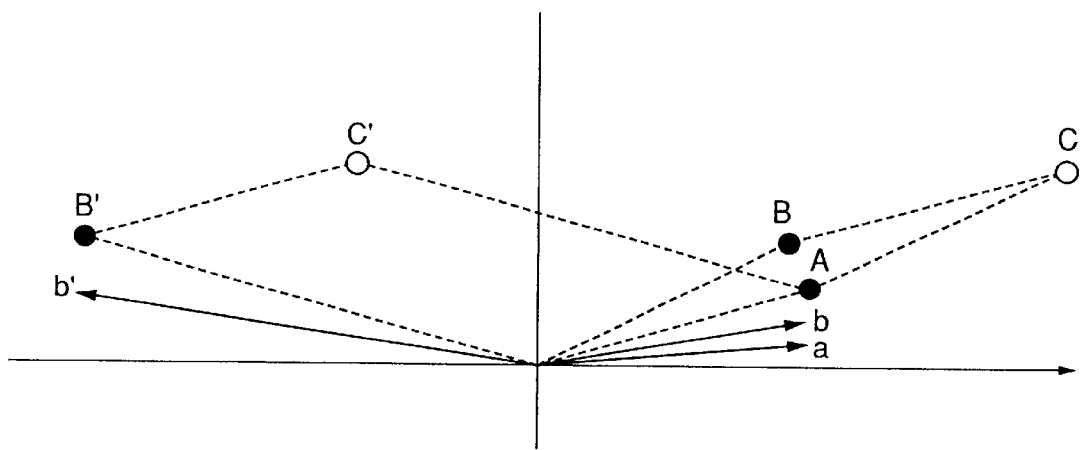
FIG. 27 is a signal space diagram of the received signal before input to the coherent detector.

FIG. 17 shows waveforms of the received signal, a PN sequence synchronized to the transmitter 10, and the BPSK modulated signal, and corresponding signal spectrums. The received signal shown in FIG. 17(*a*) is here assumed to contain narrowband interference from another transmitter mixed with the desired wideband signal. The received signal is correlated by multiplication with a PN sequence synchronized to the transmitter as shown in (b) to derive the BPSK modulated signal with a narrowband spectrum as shown in (c).

The narrowband interference from another station was not been spread by the transmitter and is therefore not correlated with the desired signal sequence, but is rather spread and converted to a low level interference wave as shown in (c). That is, by using a spread spectrum system in which the transmitter spreads the desired signal and the receiver then despreads the signal, the effects of interference from other sources can be reduced and highly secure communication can be achieved.

The BPSK modulated signal output from spectrum despreading circuit 120 is input to the demodulator 30, and phase corrected for each state. The timing of the phase corrected output is then adjusted by the shift registers and the signals are combined. The combiner output is Viterbi decoded, and the most-probable decoding result is output from demodulator 30. The output of demodulator 30 is decoded by an audio decoder, for example, and the decoded audio, video, or other data is output.

In a communication system thus comprise d diversity signals are combined after matching the received signal timing following phase correction for each state, and the phase correction factor is updated according to the most-probable path in the same manner as a conventional Viterbi decoder with a coherent detection function. In addition, by also updating shift register content, coherent detection along the best Viterbi decoding path and time diversity can be simultaneously achieved.

While impossible to accomplish with a conventional Viterbi decoder, it is therefore possible to apply the present invention to a time diversity system performing coherent detection to each Viterbi decoding state and achieve good system characteristics. It is also possible to provide a communication system with excellent security and resistance to interference by applying the present invention to a spread spectrum system in which the signal spectrum is spread and then despread during transmission and reception.

It is to be noted that in the seventh preferred embodiment described above the transmitter 10 spreads the spectrum after BPSK modulation, and the receiver 20 first despreads the signal before coherent detection. The invention shall not be limited to this order of operations, however, and it is alternatively possible to apply BPSK modulation after spectrum spreading, and perform coherent detection before despreading.

A demodulator and communication system according to the present invention described above achieve the benefits and advantages described below.

That is, by integrating shift registers to apply time diversity to each state of the Viterbi decoder and memory for coherent detection, diversity combining can be accomplished after coherent detection, and good characteristics can be realized even under conditions in which phase shift results from fading.

A significant diversity effect can also be achieved by further designing the combining circuit of the decoder to use maximal ratio combining.

Moreover, a small circuit configuration can be achieved by designing the combining circuit of the decoder to perform selective combining.

Transmission efficiency can also be improved by using punctured coding in the convolutional code to improve the coding rate. Error correction performance can also be improved by lowering the coding rate.

The diversity effect of the time diversity system can yet further be improved by applying different delay times to the separated signal sequences to achieve time diversity on the transmission and receiving sides.

Furthermore, characteristics improvement in the presence of slow fading can also be increased by maximizing the delay time applied on the transmission and receiving sides in a same signal sequence for time diversity.

Yet further, resistance to interference can be improved and a highly secure communication system can be achieved by using a spread spectrum system in which the modulated signal is spread and the received signal is despread before demodulation.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A demodulator for demodulating a multiplexed data sequence containing a plurality of data sequences of a same content multiplexed with a time difference inserted therebetween, comprising:
   a phase correcting means for correcting a phase of the multiplexed data sequence;
   a diversity combining means for separating a multiplexed data sequence output from the phase correcting means into a plurality of data sequences, removing said time difference, and combining said data sequences; and
   a Viterbi decoding means for Viterbi decoding said diversity combined signal output from the diversity combining means.

2. The demodulator as set forth in claim 1, wherein the phase correcting means comprises:
   phase correction memory for storing phase correction factor data; and
   a multiplier for multiplying said multiplexed data sequence and phase correction factor data read from the phase correction memory.

3. The demodulator as set forth in claim 1, wherein the diversity combining means comprises:
   a demultiplexing means for separating said multiplexed data sequence into a plurality of data sequences, and outputting said plurality of data sequence
   a delay means f or delaying at least one of said plurality of data sequences output from the demultiplexing means a delay time equal to s aid time difference; and
   a diversity combiner for combining a data sequence delayed by said delay means, and a data sequence input from said demultiplexing means without being delayed by said delay means.

4. The demodulator as set forth in claim 3, wherein the diversity combiner comprises:
   an absolute value detector for detecting an absolute value of an input data sequence; and
   a vector adder for weighting said data sequence based on the absolute value detected by said absolute value detector, and then combining said data sequence.

5. The demodulator as set forth in claim 3, wherein the diversity combiner comprises:
   a level detector for detecting a received signal level of an input data sequence; and
   a data sequence selector for selecting a data sequence delayed by said delay means, or a data sequence output from the demultiplexing means and not delayed by said delay means, based on the received signal level detected by said level detector.

6. A communication system comprising a transmitter for modulating and transmitting a supplied signal, and a receiver for receiving a signal transmitted by said transmitter and demodulating said received signal, wherein
   the transmitter comprises:
      a convolutional encoding means for convolutional encoding a supplied signal and outputting a convolutional coded data sequence;
      a multiplexing means for branching a data sequence output from the convolutional encoding means into a plurality of data sequences, and multiplexing said data sequences with
   a time difference inserted therebetween; and
      a modulation means for modulating a multiplexed data sequence generated by said multiplexing means to generate a transmission signal; and
   the receiver comprises:
      a phase correcting means for correcting a phase of a received signal;
      a diversity combining means for separating a signal output from the phase correcting means into a plurality of data sequences, removing said inserted time difference, and combining said data sequences; and
      a Viterbi decoding means for Viterbi decoding said combined signal output from the diversity combining means.

7. A communication system comprising a transmitter for modulating and transmitting a supplied signal, and a receiver for receiving a signal transmitted by said transmitter and demodulating said received signal, wherein
   the transmitter comprises:
      a second convolutional encoding means for convolutional encoding a supplied signal at a ¼ coding rate and outputting four data sequences;
      a second multiplexing means for branching each data sequence output from the second convolutional encoding means into two data sequences, and multiplexing said data sequences with a time difference inserted therebetween; and
      a modulation means for modulating a multiplexed data sequence generated by said second multiplexing means to generate a transmission signal; and
   the receiver comprises:
      a phase correcting means for correcting a phase of a received signal;
      a second diversity combining means for separating a signal output from the phase correcting means into eight data sequences, removing said inserted time difference from the data sequences, and combining said data sequences; and
      a Viterbi decoding means for Viterbi decoding said combined signal output from the second diversity combining means.

8. A communication system comprising a transmitter for modulating and transmitting a supplied signal, and a receiver for receiving a signal transmitted by said transmitter and demodulating-paid received signal, wherein
   the transmitter comprises:
      a convolutional encoding means for convolutional encoding a supplied signal and outputting two data sequences;
      a third multiplexing means for branching each data sequence output from the convolutional encoding means into two data sequences to obtain four parallel data sequences, delaying a second, third, and fourth of said four data sequences a delay time T, 2T, and 3T (where T is a specific time), respectively, and multiplexing said data sequences; and
      a modulation means for modulating a multiplexed data sequence generated by said third multiplexing means to generate a transmission signal; and
   the receiver comprises:
      a phase correcting means for correcting a phase of a received signal;

a third diversity combining means for separating a signal output from the phase correcting means into four data sequences, removing said inserted time difference from the data sequences, and combining said data sequences; and a Viterbi decoding means for Viterbi decoding said combined signal output from the third diversity combining means.

9. A communication system comprising a transmitter for modulating and transmitting a supplied signal, and a receiver for receiving a signal transmitted by said transmitter and demodulating said received signal, wherein the transmitter comprises:

a convolutional encoding means for convolutional encoding a supplied signal and outputting two data sequences;

a fourth multiplexing means for branching each data sequence output from the convolutional encoding means into two data sequences to obtain four parallel data sequences, delaying a second, third, and fourth of said four data sequences a delay time 2T, T, and 3T (where T is a specific time), respectively, changing an order of said data sequences, and multiplexing said data sequences; and a modulation means for modulating a multiplexed data sequence generated by said fourth multiplexing means to generate a transmission signal; and the receiver comprises:

a phase correcting means for correcting a phase of a received signal;

a fourth diversity combining means for separating a signal output from the phase correcting means into four data sequences, removing said inserted time difference from the data sequences, restoring the order of said data sequences, and combining said data sequences; and a Viterbi decoding means for Viterbi decoding said combined signal output from the fourth diversity combining means.

10. A communication system comprising a transmitter for modulating and transmitting a supplied signal, and a receiver for receiving a signal transmitted by said transmitter and demodulating said received signal, wherein the transmitter comprises:

a convolutional encoding means for encoding a supplied signal and outputting a plurality of data sequences;

a multiplexing means for branching each data sequence output from the convolutional encoding means, and multiplexing said data sequences with a time difference inserted therebetween;

a modulation means for modulating a multiplexed data sequence generated by said multiplexing means; and a spectrum spreading means for spectrum spreading a modulation signal modulated by said modulation means to obtain a transmission signal; and the receiver comprises:

a spectrum despreading means for despreading a received signal spectrum;

a phase correcting means for correcting a phase of a signal output from said spectrum despreading means;

a diversity combining means for separating a signal output from the phase correcting means into a plurality of data sequences, removing said inserted time difference, and combining said data sequences; and a Viterbi decoding means for Viterbi decoding said combined signal output from the diversity combining means.

* * * * *